US 12,010,723 B2

(12) United States Patent
Berggren et al.

(10) Patent No.: US 12,010,723 B2
(45) Date of Patent: Jun. 11, 2024

(54) NETWORK CONFIGURATION FOR MONITORING AN OPEN SPECTRUM

(71) Applicant: Sony Group Corporation, Tokyo (JP)

(72) Inventors: Anders Berggren, Lund (SE); Nafiseh Mazloum, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 309 days.

(21) Appl. No.: 17/624,813

(22) PCT Filed: Jul. 2, 2020

(86) PCT No.: PCT/EP2020/068719
§ 371 (c)(1),
(2) Date: Jan. 4, 2022

(87) PCT Pub. No.: WO2021/018513
PCT Pub. Date: Feb. 4, 2021

(65) Prior Publication Data
US 2022/0287092 A1    Sep. 8, 2022

(30) Foreign Application Priority Data
Jul. 26, 2019  (SE) .................................. 1930255-3

(51) Int. Cl.
*H04W 74/0816*  (2024.01)
*H04W 16/14*  (2009.01)
*H04W 76/28*  (2018.01)

(52) U.S. Cl.
CPC ....... *H04W 74/0816* (2013.01); *H04W 16/14* (2013.01); *H04W 76/28* (2018.02)

(58) Field of Classification Search
CPC .. H04W 74/0816; H04W 16/14; H04W 76/28
See application file for complete search history.

(56) References Cited

U.S. PATENT DOCUMENTS

| 2013/0235780 | A1* | 9/2013 | Kim | .................. | H04W 52/0235 |
|---|---|---|---|---|---|
| | | | | | 370/311 |
| 2013/0308507 | A1* | 11/2013 | Wanstedt | .......... | H04W 52/0216 |
| | | | | | 370/311 |
| 2021/0112536 | A1* | 4/2021 | Shah | ..................... | H04L 5/0048 |
| 2021/0185762 | A1* | 6/2021 | Li | ..................... | H04W 52/0216 |

(Continued)

FOREIGN PATENT DOCUMENTS

| WO | 2016040254 A2 | 3/2016 |
|---|---|---|
| WO | 2016072787 A1 | 5/2016 |

(Continued)

OTHER PUBLICATIONS

International Search Report from corresponding International Application No. PCT/EP2020/068719, mailed on Oct. 15, 2020, 4 pages.

(Continued)

*Primary Examiner* — Chae S Lee
(74) *Attorney, Agent, or Firm* — Tucker Ellis LLP

(57) ABSTRACT

A network configuration of a wireless communication device monitoring an open spectrum is provided. The wireless communication device monitors the open spectrum for a channel occupancy time acquisition signal, in accordance with the configuration and a discontinuous reception cycle.

13 Claims, 14 Drawing Sheets

(56) References Cited

U.S. PATENT DOCUMENTS

2021/0298115 A1* 9/2021 Shi .................... H04W 52/0274
2022/0104260 A1* 3/2022 Wang .................... H04W 72/20

FOREIGN PATENT DOCUMENTS

WO   2016164202 A1   10/2016
WO   2020165200 A1   8/2020

OTHER PUBLICATIONS

Office Action and Search Report from corresponding Swedish Application No. 1930255-3, mailed on Mar. 12, 2020, 10 pages.
Qualcomm Incorporated, "DRX Active Time for NR-U", 3GPP TSG-RAN WG2 Meeting #106, R2-1906325, May 13-17, 2019, 4 pages.
Qualcomm Incorporated, "DRX for NR-U", 3GPP TSG-RAN2#105, R2-1902150, Feb. 25-Mar. 1, 2019, 4 pages.
Panasonic et al., "DRX Enhancement for NR-U", 3GPP TSG-RAN WG2 Meeting #106, R2-1907154, May 13-17, 2019, 4 pages.
ZTE Corporation et al., "DRX Operation for NR-U", 3GPP TSG RAN WG2 NR #106 Meeting, R2-1906312, May 13-17, 2019, 2 pages.

* cited by examiner

NETWORK CONFIGURATION FOR MONITORING AN OPEN SPECTRUM

TECHNICAL FIELD

Various examples relate to monitoring an open spectrum for a channel occupancy time acquisition signal. Various examples relate to monitoring the open spectrum in accordance with a discontinuous reception cycle and a network configuration. Various examples also relate to switching between different settings of the discontinuous reception cycle when monitoring the open spectrum.

BACKGROUND

To facilitate efficient spectrum usage and high data rates, wireless communication on an open spectrum is possible. Multiple operators or networks may share access to the open spectrum. In other words, access to the open spectrum may not be restricted to a single operator or network. There may not be central scheduling for all devices accessing the open spectrum. Thus, there is a risk of collision between two devices that try to contemporaneously access the open spectrum.

To avoid such collision, the wireless communication on the open spectrum typically involves collision-mitigation procedures. Such techniques may include, but are not limited to listen-before-talk (LBT) procedures, limitations on maximum percentage of transmissions per time unit (limited transmission duty cycle), limitations on maximum transmission output power, and limitations on the channel occupancy time (COT) per transmission. The listen-before-talk procedure may be a particular collision-mitigation procedure that requires a device intending to access the open spectrum is required to monitor the open spectrum before transmission, to find out whether or not currently other devices are accessing the open spectrum. Success or failure of the LBT depends on the access situation on the open spectrum. For example, if one or more other devices currently access the open spectrum, then the open spectrum may not accommodate further transmissions and the LBT procedure fails. Thus, the channel access on the open spectrum is generally limited or, at least, a priori uncertain.

If the LBT procedure is successful, the device can access the spectrum. It would also be possible that the LBT procedure is unsuccessful, i.e., fails: then, the device attempting to access the spectrum may be temporarily prevented from doing so. For example, a back-off time duration may be required after a failing LBT procedure.

There are techniques known to use a radio access technology (RAT) of a cellular network—e.g., the RAT of the Third Generation Partnership Project (3GPP) New Radio (NR) 5G cellular network—on the open spectrum. These techniques target to adapt the specifications of the cellular network to be able to operate not only in a licensed spectrum with central scheduling, but also on an open spectrum. For example, this may imply taking into consideration that channel access within a certain timeframe cannot be a-priori guaranteed. Rather, an LBT procedure may be required. Typically, the RAT of the cellular network operates using a time-domain structure employing transmission frames of a given length and at well-defined timings within a respective time reference. Thus, there are typically at least two timing constraints affecting the transmission timing: firstly, (i) restricted availability of the access to the open spectrum; and, secondly, (ii) timing constraints imposed by the time-domain structure of the RAT. It has been found that accommodating for these two timing constraints can be challenging.

Sometimes, there is even a further timing constraint, in addition to the above-identified timing constraints: sometimes a wireless communication device (also referred to as user equipment, UE) operates according to a discontinuous reception (DRX) cycle. This is done to reduce power consumption. The DRX cycle typically includes ON durations and OFF durations. During the OFF durations, the UE can shut down or otherwise deactivate certain parts of its receiver of the wireless interface, to thereby reduce the power consumption. Accordingly, during the OFF durations the UE is unfit to receive some or all signals from a base station (BS) of the cellular network. A situation can occur in which the UE operation according to a DRX cycle is combined with wireless transmission on an open spectrum. Then, multiple timing constraints for the transmission timing can be superimposed, namely: firstly, (i) limited channel access due to competing access to the open spectrum; secondly, (ii) timing constraints imposed by the timing of transmission frames of the RAT; and, thirdly, (iii) timing constraints imposed by the DRX cycle.

There are studies addressing these competing time-domain constraints. See, e.g., 3GPP R2-1907154. According to this document, the UE extends the ON duration of the DRX cycle if the UE detects a COT acquisition (COT-AS) signal from the BS of the serving cell. The COT-AS may be indicative of a successful LBT procedure of the BS.

Such techniques face certain restrictions and drawbacks. For example, based on such fixed settings of the UE behavior, it can be difficult to implement an appropriate balance between, on the one hand, UE power consumption (longer or shorter ON durations of the DRX cycle affect the UE power consumption), and, on the other hand, timely transmission of data in view of the particular access situation on the open spectrum.

SUMMARY

Accordingly, there is a need for advanced techniques of data transmission on an open spectrum using a RAT of a cellular network. In particular, there is a need for advanced techniques of data transmission for a UE that employs a DRX cycle.

This need is met by the features of the independent claims. The features of the dependent claims define embodiments A method of operating a UE includes receiving, from a network, a configuration for monitoring an open spectrum. The method also includes, in accordance with the configuration and a DRX cycle, monitoring the open spectrum for a COT-AS from an access node of the network. The method further includes, based on said monitoring, determining whether or not at least one trigger criterion is met. In accordance with said determining whether or not the at least one criterion is met, the method further includes switching between two or more settings of the discontinuous reception cycle.

In one example, the configuration includes the at least one trigger criterion for said switching between the two or more settings.

In a further example, the configuration includes an activation duration of a given setting of the two or more settings.

In yet a further example, the configuration includes values of one or more parameters of the two or more settings of the discontinuous reception cycle.

For example, the one or more parameters may include at least one of a periodicity of the discontinuous reception cycle or an inactivity timer associated with the discontinuous reception cycle.

The one or more parameters may further comprise an on duration of the discontinuous reception cycle. It would be possible that the configuration includes three or more values of the on duration of the discontinuous reception cycle.

A computer program or a computer-program product or a computer-readable storage medium includes program code. The program code can be executed by at least one processor. When executing the program code, the processor performs a method of operating a UE. The method includes receiving, from a network, a configuration for monitoring an open spectrum. The method also includes, in accordance with the configuration and a DRX cycle, monitoring the open spectrum for a COT-AS from an access node of the network. The method further includes, based on said monitoring, determining whether or not at least one trigger criterion is met. In accordance with said determining whether or not the at least one criterion is met, the method further includes switching between two or more settings of the discontinuous reception cycle.

A wireless communication device comprises a control circuitry. The control circuitry is configured to receive, from a network, a configuration for monitoring an open spectrum. The control circuitry is also configured to, in accordance with the configuration and a DRX cycle, monitor the open spectrum for a COT-AS from an access node of the network. The control circuitry is further configured, based on said monitoring, determine whether or not at least one trigger criterion is met. The control circuitry is further configured to switch, in accordance with said determining whether or not the at least one criterion is met, between two or more settings of the discontinuous reception cycle.

A method of operating an access node of a network includes transmitting, to a wireless communication device, a configuration for monitoring an open spectrum by the wireless communication device. The method also includes performing a listen-before-talk procedure on the open spectrum. The method further includes, in response to the listen-before-talk procedure being successful, transmitting, to the wireless communication device and in accordance with the configuration, a channel occupancy time acquisition signal.

A computer program or a computer-program product or a computer-readable storage medium includes program code. The program code can be executed by at least one processor. When executing the program code, the processor performs a method of operating an access node of a network. The method includes transmitting, to a wireless communication device, a configuration for monitoring an open spectrum by the wireless communication device. The method also includes performing a listen-before-talk procedure on the open spectrum. The method further includes, in response to the listen-before-talk procedure being successful, transmitting, to the wireless communication device and in accordance with the configuration, a channel occupancy time acquisition signal.

An access node comprises a control circuitry. The control circuitry is configured to transmit, to a wireless communication device, a configuration for monitoring an open spectrum by the wireless communication device. The control circuitry is also configured to perform a listen-before-talk procedure on the open spectrum. The control circuitry is further configured to transmit, in response to the listen-before-talk procedure being successful, to the wireless communication device and in accordance with the configuration, a channel occupancy time acquisition signal.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 6 schematically illustrates operation of the UE in accordance with a DRX cycle according to various examples, wherein FIG. 6 illustrates ON and OFF durations.

FIG. 7 schematically illustrates operation of the UE in accordance with a DRX cycle according to various examples, wherein FIG. 7 illustrates an inactivity timer.

FIG. 9 is a signaling diagram of communication between the UE and the BS according to various examples, wherein FIG. 9 illustrates an LBT procedure.

DETAILED DESCRIPTION OF EMBODIMENTS

Figure 1:
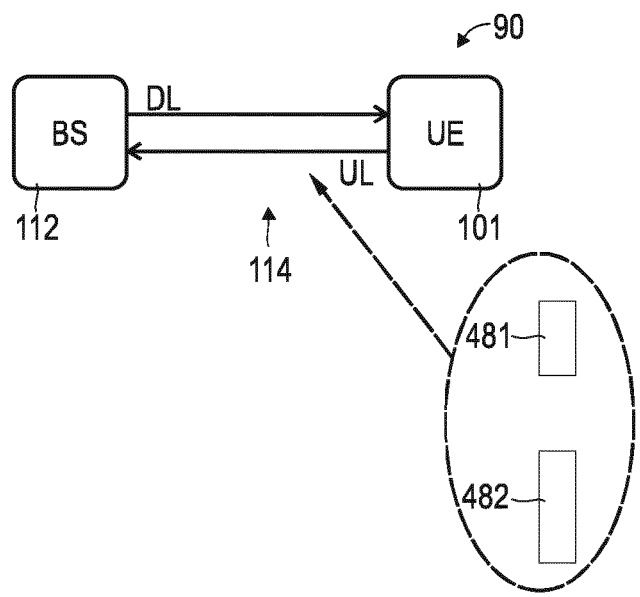
FIG. 1 schematically illustrates communication between a UE and a BS on a wireless link according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication are described. Specifically, techniques are described which allow for wireless communication on an open spectrum. On the open spectrum, time-frequency resources are typically not centrally scheduled. Therefore, LBT procedures are employed to avoid collision between multiple devices attempting to access the open spectrum contemporaneously. There may not be a single operator in charge of allocating the time-frequency resources to the various devices on the open spectrum. Devices associated with multiple operators may access the open spectrum.

For example, techniques will be described that allow to meet timing constraints imposed by a COT. As a general rule, according to typical implementations of the open spectrum access regulations, the transmitting device has a maximum transmission time upon gaining access to the channel. This time is denoted maximum COT (MCOT).

The devices have to make sure that the COT does not exceed the MCOT. Typically, the regulators define one MCOT for a certain frequency band, and the specifications targeting to use that band may fully utilize the MCOT or may define shorter COTs for different signaling types.

Techniques will be described that facilitate using a COT-AS. As a general rule, the term COT-AS may denote any signal transmitted by the BS that the UE can detect which is indicative of that the BS has been successful in accessing the open spectrum. Such transmission may include, but is not limited to a reference signal, a synchronization signal, a control information signal, a scheduling indicator signal, a hybrid ARQ indication signal or a data transmission. Since the COT-AS transmitted by the BS indicates that the BS has succeeded its LBT procedure, the UE can listen for expected further signaling on the open spectrum. When the UE detects a COT-AS transmitted by the BS, the UE can determine that the BS has started its COT or is about to start its COT. More specifically, techniques will be described which facilitate the UE monitoring the open spectrum for the COT-AS. Monitoring an open spectrum generally denotes monitoring for transmission on the open spectrum or another property of the open spectrum, e.g., a power-spectral-density. Then, if the UE detects the COT-AS, the UE may be aware of the BS intending to start its COT. Thus, the UE may prepare itself for receiving signals and data during the COT of the BS. COT-ASs may not only be employed by the BS, but generally any device transmitting on the open spectrum.

A BS-initiated COT generally denotes a transmission on the open spectrum that is initiated by the BS, meaning that it was the BS that performed a successful LBT procedure and secured access to use the open spectrum. The COT may then be used by the BS for downlink transmission and/or the UE for uplink transmission (a scenario sometimes referred to COT sharing). As described for the term COT, this means that the BS has clearance to use the open spectrum for transmissions up to the time defined by the COT according to the specifications outlined by the communication protocol standard or the regulations. I.e., the COT can be as long as the MCOT from regulations, or shorter if defined by the protocol standard.

When a UE monitors for BS transmissions of, e.g., the COT-AS during repeated monitoring windows—as is, e.g., the case for a UE monitoring in accordance with a DRX cycle —, the rate of successful detections of the COT-AS during these windows can be denoted as COT-AS reception rate. Such COT-AS reception rate may be calculated as a percentage (#on duration times with a detected BS transmission of COT-AS/#on duration times without a detected BS transmission), e.g., calculated over a certain number monitoring windows.

Hereinafter, various techniques relate to operating a RAT of a cellular network on an open spectrum. According to various examples, a time-frequency resource grid of the RAT can be used to implement communication between two devices, wherein the time-frequency resource grid resides on the open spectrum. Time-frequency resources of the resource grid are allocated to certain devices: A scheduler—typically, a BS of a cellular network—can allocate certain time-frequency resources defined in the time-frequency resource grid to other devices operating in accordance with the RAT, e.g., one or more UEs.

Hereinafter, techniques of operating a UE are described. In particular, the UE may monitor a spectrum—e.g., the above-mentioned open spectrum—using a DRX cycle. The DRX cycle can include repetitive ON durations; wherein, between two ON durations, an OFF duration is arranged. The UE may not be fit to receive all or any signals during the OFF durations. A receiver of a wireless interface may be operated in an inactive state during the OFF durations. The DRX cycle is characterized by various parameters. The set of parameters including their values can be generally referred to as a setting of the DRX cycle. For example, in a first setting of the DRX cycle, the ON duration may take a first value; while in a second setting of the DRX cycle, the ON duration may take a second value.

Various techniques are based on the finding that it can be challenging to meet multiple timing constraints imposed by (i) limited or non-guaranteed access to the open spectrum, as well as imposed by (ii) timing constraints imposed by the time-frequency resource grid of the RAT, and/or imposed by (iii) timing constraints imposed by the DRX cycle of the UE.

Various techniques are based on the finding that starting positions of a transmission on the open spectrum can be a-priori unknown. For example, in a 3GPP RAT, the transmissions between BS and UE are divided into transmission frames. More specifically, the 3GPP RAT operates with a system of frames and subframes. The timing is determined by the BS, and all transmissions are expected to follow the transmission frames, meaning that it is determined in the 3GPP specifications when within a transmission frame a certain transmission is expected to occur. However, in an open spectrum any device intending to perform a transmission (e.g., which intends to transmit at a time related to the frame timing as defined in the 3GPP standard) first may be required to ensure that the open spectrum is not already occupied by another device. This may be enforced by the LBT procedure being required prior to any transmission. As per regulation, this therefore means that although a device has a fully known intended starting position of a transmission, the LBT procedure may impose a delay until the device has a possibility to transmit during its COT. This means that the real transmission may occur later than the intended starting position, but it is not known a-priori—e.g., before performing the LBT procedure—when in time (how long delay) this may happen. Hence, in practice there will be unknown starting positions of a transmission on the open spectrum.

The techniques described herein provide strategies to flexibly and dynamically adjust the setting of the DRX cycle, depending on the communication on the open spectrum. Thereby, certain disadvantages and restrictions associated with the transmission on the open spectrum in combination with the transmission in accordance with the DRX cycle can be mitigated.

According to various examples, it is possible to implement a configuration for monitoring the open spectrum in accordance with the DRX cycle, the configuration being provided by the network. More specifically, the configuration can be associated with multiple settings of the DRX cycle. In the various techniques described herein, various options for network configuring said monitoring of the open spectrum are available.

To give a few examples, it would be possible that the configuration includes at least one trigger criterion. In particular, based on the at least one trigger criterion, the UE can switch between multiple settings of the DRX cycle. The at least one trigger criterion can generally define one or more events associated with monitoring the open spectrum. More specifically, it would be possible that the trigger criterion determines certain reference characteristics with respect to reception of the COT-AS. For instance, the trigger criterion may specify a certain time reference (reference reception timing) or frequency reference (reference reception frequency) with which the actual reception of the COT-AS is compared. Then, if the reception fulfills such reference, the event may be detected and the trigger criterion may be considered met. Once the trigger criterion is met, the UE can switch to another setting of the DRX cycle. The techniques described herein facilitate a network configuration of one or more such trigger criteria. Thereby, it would be possible to tailor the trigger criterion to the particular access situation on the open spectrum and/or to the particular power-consumption requirements or other requirements imposed by the UE. UE-specific trigger criteria would become possible. The trigger criteria can be dynamically changed, e.g., in view of changing conditions on the open spectrum or changing UE requirements.

In a further example, it would be possible that the configuration includes a value of a parameter or includes values of multiple parameters of settings of the DRX cycle. In other words, it would be possible that the settings of the DRX cycle between which the UE switches (e.g., in accordance with the trigger criterion or trigger criteria) are network-configured. To give a few examples, it would be possible that multiple settings are defined by means of the configuration, wherein different settings employ different values for the ON duration of the DRX cycle or different values for the OFF durations of the DRX cycle. For instance, there may be three settings that all define different ON durations. Another example would be to employ different values for the inactivity timer of the DRX cycle. The DRX cycle inactivity timer can define a duration (e.g., expressed in a number of consecutive subframes of the time-frequency resource grid of the RAT) for which the UE shall extend the particular ON duration after reception of a control channel signal. In yet another example, it would be possible to employ different values for the periodicity (i.e., cycle length) of the DRX cycle.

In yet a further example, it would be possible that the configuration includes an activation duration of a given setting of the DRX cycle. For example, if the trigger criteria on is met, than the UE may switch from a first setting to a second setting of the DRX cycle. The activation duration may then specify for how long this second setting of the DRX cycle remains activated. For example, the second setting may specify a prolongation of the on durations of the DRX cycle. Then, the activation duration may specify for how long the on durations of the DRX cycle remain prolonged. Then, after expiry of the activation duration, the UE may automatically switch back to the first setting of the DRX cycle or another setting of the DRX cycle.

As will be appreciated from the above, there are various options available for implementing the configuration of the UE monitoring the open spectrum by the network. A specific practical example of such strategies for the network-configuration of the UE monitoring behavior is given below: In this example, the UE monitors the historical statistics of one of more parameters, e.g., COT-AS reception rate, COT-AS reception timing within an ON duration, e.g., how frequent the network transmits the COT-AS later than a reference timing threshold. The UE then compares the statistics with one or more trigger criteria—e.g., network-configured or predefined—to compare the statistics to. Monitoring and detecting trigger criteria can be controlled via network configuration of the UE. One or more rule sets may be implemented. Such configuration for how the UE shall modify its monitoring of the open spectrum could either be preconfigured within 3GPP standard, or it could be configured based on signaling from the network. Alternatively or additionally, the configuration may determine for how many of upcoming periods of the DRX cycle the modification should be applied to, i.e., define an activation duration of the modified DRX cycle setting. As an example, the modification could be done to all future periods of the DRX cycle until the UE enters idle network registration mode. This has the advantage that only one adaptation is made per active period which may be beneficial not to achieve ping-pong between different configurations. As a further example, the modification of the setting of the DRX cycle could be done or for a given number of periods (e.g. 1, 10, 100 . . . ) of the DRX cycle. This has the advantage that the network can control how frequent modifications should be done which is beneficial for network management and control. In a further example, the modifications should be for a specific time/ active duration that is not related to number of periods of the DRX cycle. This is beneficial for same reasons as the given number of cycles since a given time will, by definition, correspond to a certain number of DRX cycle periods, but be different number of periods of the DRX cycle depending on the value of the DRX periodicity. In practice, multiple trigger criteria—e.g., multiple reception timing thresholds—could be determined both to increase and to decrease any of the different existing DRX timer values. For example the length of the ON duration could be increased in case the first BS transmissions are frequently detected by the end of the on-duration (e.g., within the last 80% of the time window)—while the length of the ON duration could be reduced in case the BS transmissions are frequently detected early within the ON duration (e.g. within the first 20% of the ON duration).

As will be appreciated from the above, various options for implementing the configuration that is provided by the network, e.g., the BS, to the UE are available. In the various scenarios described herein, it would be possible to combine such options which each other, to form further options. In particular, multiple different parameters of the monitoring on the open spectrum may be network-configured.

FIG. 1 schematically illustrates a wireless communication system 90 that may benefit from the techniques disclosed herein. The communication system 90 includes a UE 101 and an access node of a network, here implemented by a BS of a cellular network. As a general rule, the techniques described herein may be applied to networks of various kinds and types: The network may be a 3GPP-standardized network such as 3G, 4G-LTE, or upcoming 5G-NR. Other examples include point-to-point networks such as Institute of Electrical and Electronics Engineers (IEEE)-specified networks, e.g., the 802.11x Wi-Fi protocol or the Bluetooth protocol. Further examples include 3GPP Narrowband Internet of Things (NB-IoT or enhanced Machine Type Communication (eMTC) networks.

A wireless link 114 is established between the BS 112 and the UE 101. The wireless link 114 includes a DL link from the BS 112 to the UE 101; and further includes an UL link from the UE 101 to the BS 112.

The wireless link 114 may at least partly be implemented on an open spectrum 481 (see circular inset in FIG. 1). I.e., a carrier and/or multiple subcarriers of the wireless link 114 reside on the open spectrum 481. Another part of the wireless link 114 may be implemented on a dedicated spectrum 482. The dedicated spectrum 382 may be fully controlled by the network operator.

The UE 101 may e.g. be one of the following: a smartphone; a cellular phone; a tablet; a notebook; a computer; a smart TV; an MTC device; an eMTC device; an IoT device; an NB-IoT device; a sensor; an actuator; etc.

Figure 2:
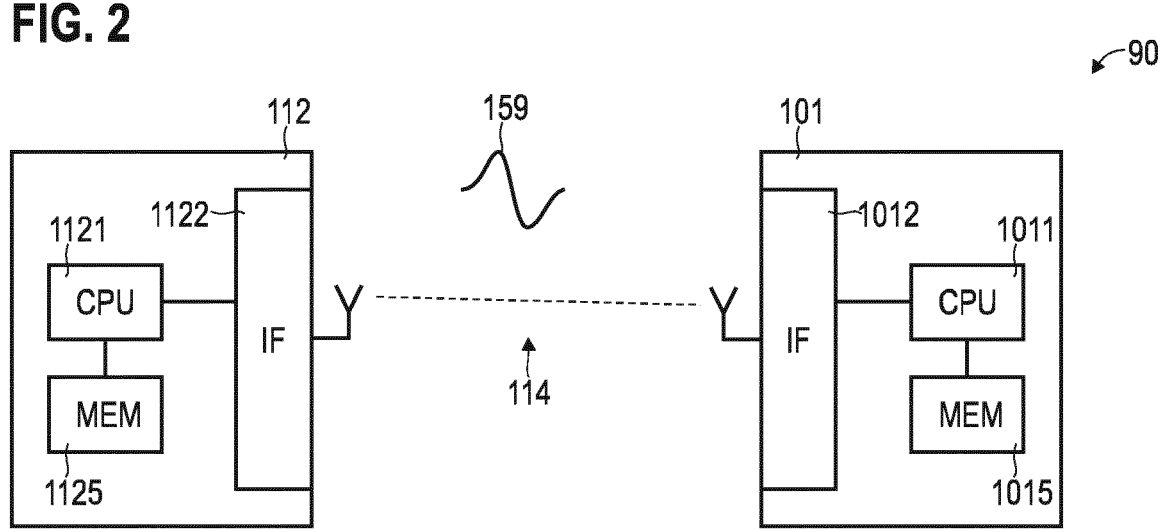
FIG. 2 schematically illustrates the UE and the BS in further detail according to various examples.

FIG. 2 schematically illustrates the BS 112 and the UE 101 in greater detail.

The BS 112 includes a processor (CPU) 1121 and an interface (IF) 1122, sometimes also referred to as frontend. The IF 1122 includes a receiver and a transmitter. The BS 112 further includes a memory (MEM) 1125, e.g., a non-volatile memory. The memory may store program code that can be executed by the processor 1121. Thus, the processor 1121 and the memory 1125 form a control circuitry. Executing the program code may cause the processor 1121 to perform techniques with respect to: attempting to transmit and transmitting on an open spectrum; transmitting during a COT and in accordance with an MCOT; performing an LBT procedure; implementing transmission attempts on the open spectrum; implementing a back-off; transmitting COT-AS; providing a configuration to the UE 101 for monitoring the open spectrum; etc.

The UE 101 includes a processor (CPU) 1011 and an interface (IF) 1012, sometimes also referred to as frontend. The IF 1012 includes a receiver and a transmitter. The UE 101 further includes a memory (MEM) 1015, e.g., a non-volatile memory. The memory 1015 may store program code that can be executed by the processor 1011. Thus, the processor 1011 and the memory 1015 form a control circuitry. Executing the program code may cause the processor 1011 to perform techniques with respect to: monitoring an open spectrum; receiving a COT-AS on the open spectrum; monitoring a spectrum in accordance with a DRX cycle; implementing different settings for the DRX cycle; receiving a configuration from the network for monitoring on the open spectrum; etc.

As a general rule, monitoring a spectrum may relate to attempting to receive one or more signals. This may include decoding, blind decoding, and/or demodulating.

FIG. 2 also illustrates a COT-AS 159. The COT-AS 159 is transmitted by the BS 112 and received by the UE 101. The COT-AS 159 facilitates indication that the BS 112 has been successful in the LBT procedure. The COT-AS 159 indicates that the BS 112 will transmit a signal in accordance with the RAT of the network 100, e.g., the 3GPP NR RAT. The COT-AS 159 indicates an imminent COT of the BS 112.

As a general rule, it would be possible that the COT-AS 159 is a dedicated signal fulfilling the particular purpose of signaling the imminent COT. The COT-AS 159 may be communicated on particular reserved time-frequency resources, e.g., as a reference signal. The COT-AS 159 could be communicated on a downlink control channel. The COT-AS 159 could also be implemented by reference signals that perform another function, e.g., a synchronization signal (for acquiring a timing reference of the BS 112) or reference signals (for channel sounding). In any case, the COT-AS is a transmission that can be used by a receiver to gain knowledge that the transmitter unit has been successful in gaining access to the unlicensed channel.

Figure 3:
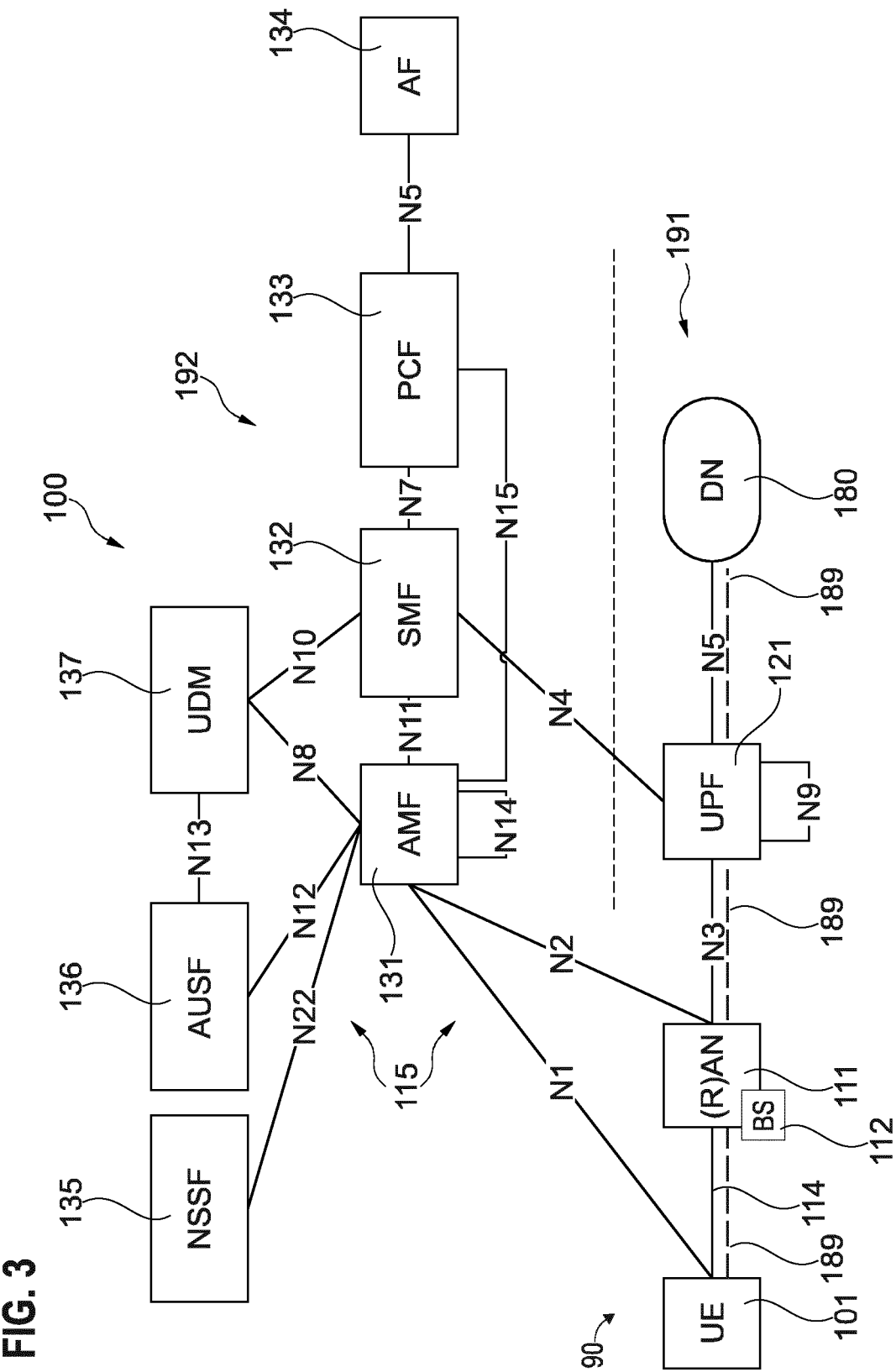
FIG. 3 schematically illustrates aspects with respect to a cellular network according to various examples.

FIG. 3 schematically illustrates an example implementation of the wireless network 100 in greater detail. The example of FIG. 3 illustrates a wireless network 100 according to the 3GPP 5G architecture. Details of the fundamental architecture are described in 3GPP TS 23.501, version 1.3.0 (2017 September). While FIG. 3 and further parts of the following description illustrate techniques in the 3GPP 5G framework, similar techniques may be readily applied to different communication protocols. Examples include 3GPP LTE 4G and IEEE Wi-Fi technology.

The UE 101 is connectable to the network 100 via a radio access network (RAN) 111, typically formed by one or more BSs 112. The wireless link 114 is established between the RAN 111—specifically between one or more of the BSs 112 of the RAN 111—and the UE 101, thereby implementing the communication system 90 (cf. FIG. 1).

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 3, the UPF 121 acts as a gateway towards a data network (DN) 180, e.g., the Internet or a Local Area Network. Application data can be communicated between the UE 101 and one or more servers on the DN 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 3 also illustrates the protocol reference points N1-N22 between these nodes.

The AMF 131 provides one or more of the following functionalities: registration management; NAS termination; connection management; reachability management; mobility management; access authentication; and access authorization The AMF 131 may keep track of the timing of a DRX cycle of the UE 101. The AMF 131 may keep track of various network registration modes in which the UE 101 can operate. The AMF 131 may trigger transmission of paging signals to the UE 101 by the BSs 112 of the RAN 111, e.g., in a tracking area to account for UE mobility.

A data connection 189 is established by the AMF 131 if the respective UE 101 operates in a connected mode. To keep track of the current network registration mode of the UEs 101, the AMF 131 sets the UE 101 to Evolved Packet System Connection Management (ECM) connected or ECM idle. During ECM connected, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

As such, the AMF 131 and the SMF 132 both implement CP mobility management needed to support a moving UE.

FIG. 3 also illustrates aspects with respect to the data connection 189. The data connection 189 is established between the UE 101 via the RAN 111 and the UP 191 of the CN 115 and towards the DN 180. For example, a connection with the Internet or another packet data network can be established. To establish the data connection 189, it is possible that the respective UE 101 performs a random access (RA) procedure, e.g., in response to reception of a paging signal. A server of the DN 180 may host a service for which application data (sometimes also referred to as payload data) is communicated via the data connection 189. The data connection 189 may include one or more bearers such as a dedicated bearer or a default bearer. The data connection 189 may be defined on the Radio Resource Control (RRC) layer, e.g., generally Layer 3 of the OSI model of Layer 2.

Figure 4:
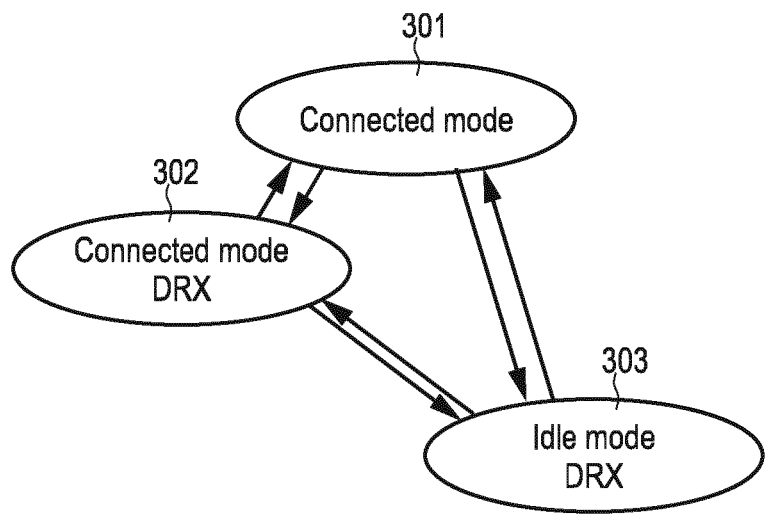
FIG. 4 schematically illustrates multiple network registration modes of the UE at the cellular network according to various examples.

FIG. 4 illustrates aspects with respect to different network registration modes 301-303 in which the UE 101 can operate. Example implementations of the operational modes 301-303 are described, e.g., in 3GPP TS 38.300, e.g., version 15.0.

During connected mode 301, the data connection 189 is set up. For example, a default bearer and optionally one or more dedicated bearers may be set up between the UE 101 and the network 100. The receiver of the UE 101 may persistently operate in an active state.

In order to reduce the power consumption, it is then possible to transition from the connected mode 301 to a connected mode 302 which employs a DRX cycle of the receiver. The DRX cycle includes ON durations and OFF durations, according to a respective timing schedule. During the OFF durations, the receiver is unfit to receive data; an inactive state of the receiver may be activated.

The timing schedule of the DRX cycle is synchronized between the UE 101 and the BS 112 and/or the AMF 131 such that the network 100 can align any DL transmission—e.g., of application data or the COT-AS 159—with the ON durations of the connected mode DRX cycle. The data connection 189 is maintained set-up in mode 302.

To achieve a further power reduction, it is possible to implement in idle mode 303. The idle mode 303 is, again, associated with the DRX cycle of the receiver of the UE 101. However, during the on durations of the DRX cycle in idle mode 303, the receiver is only fit to receive paging indicators and, optionally, paging messages. For example, this may help to restrict the particular bandwidth that needs to be monitored by the receiver during the on durations of the DRX cycles in idle mode 303. The receiver may be unfit to receive application data. This may help to further reduce the power consumption—e.g., if compared to the connected mode 302.

Various examples described herein pertain to operation of the UE 101 in the connected mode 302 or in the idle mode 303 employing the DRX cycle.

Figure 5:
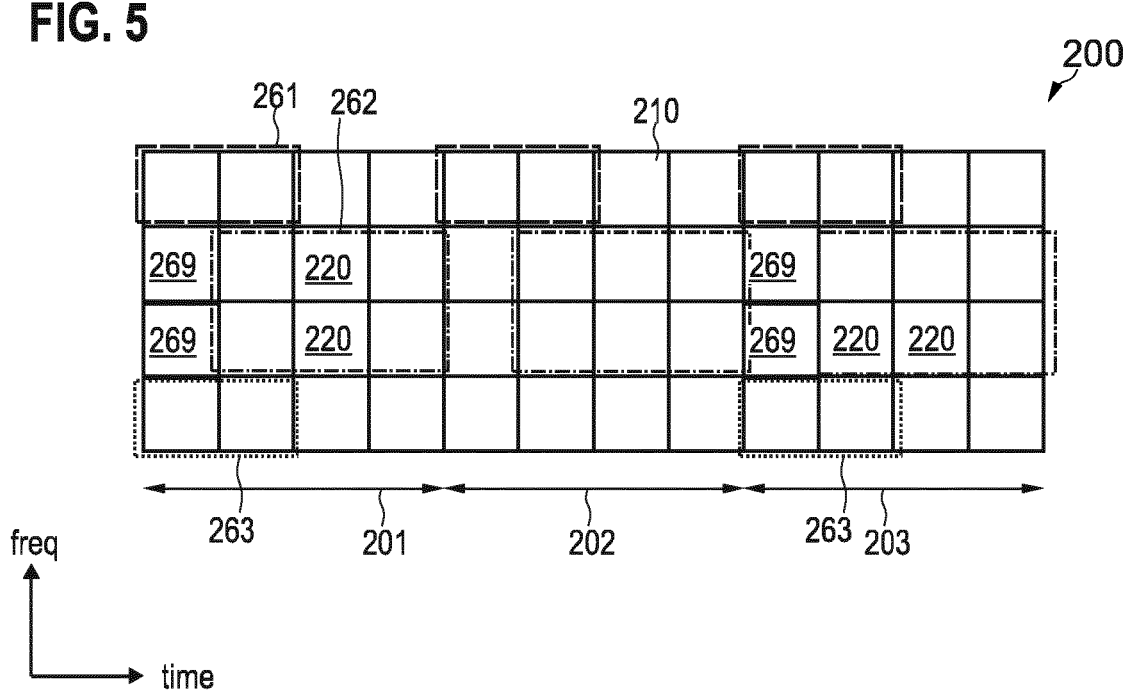
FIG. 5 schematically illustrates a time-frequency resource grid of the wireless link according to various examples.

FIG. 5 schematically illustrates aspects with respect to a time-frequency resource grid 200 including multiple time-frequency resource elements 210. The time-frequency resource grid 200 is defined by the RAN 111, in accordance with a respective RAT, for communication on the wireless link 114.

The time-frequency resource elements 210 of the time-frequency resource grid 200 are defined by symbols and subcarriers according to the OFDM modulation. Further, the time-frequency resource elements 210 are structured in time domain. For this, transmission frames 201-203 are provided. The give an example, the transmission frames 201-203 may be implemented by frames, subframes, or timeslots. Typically, a frame includes multiple subframes and a given subframe includes multiple timeslots.

As a general rule, each frame 201-203 has a certain sequence number. The sequence numbers of the frames 201-203 can implement a time reference for the respective cellular network 100. Synchronization signals indicative of the time reference can be communicated (not illustrated in FIG. 5).

FIG. 5 also illustrates aspects with respect to multiple channels 261-263. In particular, different channels 261-263 can be associated with different time-frequency resource elements 210. Different channels 261-263 can be used for different types of signals. Different channels can use different modulation and coding schemes. Some of the channels may be used for UL communication, while other channels may be used for DL communication.

A first channel (dashed line in FIG. 5)—e.g., implemented as the Physical DL Control Channel (PDCCH) 261—may carry control signals. Examples include paging indicators, which enable the cellular network 100—e.g., the AMF 131—to page a UE 101 during a PO. The PDCCH 261 may also carry scheduling grants/assignments, sometimes referred to as DL control information (DCI). COT-ASs may be transmitted on the PDCCH 261.

Further, a second channel (dashed-dotted line in FIG. 5)—e.g., implemented by the Physical DL Shared Channel (PDSCH) 262—is associated with a payload DL messages carrying higher-layer data. Higher-layer messages may include Radio Resource Control (RRC) control messages, e.g., paging messages. The paging messages can be indicative of the identities of the particular UE to be paged. The PDSCH 262 can also carry messages including payload data from the UP 191. A COT-AS may be transmitted on the PDSCH 262.

While in the scenario of FIG. 5 only the PDSCH 262 for DL messages is illustrated, the time-frequency resource grid 200 can also include time-frequency resources 210 allocated to a Physical UL Shared Channel (PUSCH) (not illustrated in FIG. 5). For example, payload UL messages carrying higher-layer data or UP 191 payload data can be communication on the PUSCH.

Further, a third channel (dotted line in FIG. 5)—e.g., implemented by the Physical UL Control Channel (PUCCH) 263—is an UL control channel. The PUCCH 263 could e.g. include scheduling requests, e.g., implemented by a buffer status report (BSR). This can trigger scheduling at the BS 112. Then, a scheduling grant on the PDCCH 261 can be used to indicate allocations 220 on the PUSCH. On the other hand, for scheduling DL data, a DL notification can be transmitted on the PDCCH; and an associated allocation 220 on the PDSCH 262 can be indicated.

Some of the time-frequency resource elements 210 can also be reserved for the transmission of reference signals, see reservations 269. Reference signals transmitted on the reservations 269 can generally facilitate the transmission, e.g., by providing for channel sounding, synchronization, etc. Some of the time-frequency resource elements can also be reserved for the transmission of COT-ASs. Typically, such a reservation of the time-frequency resource elements 210 will be reoccurring over time.

Figure 6:
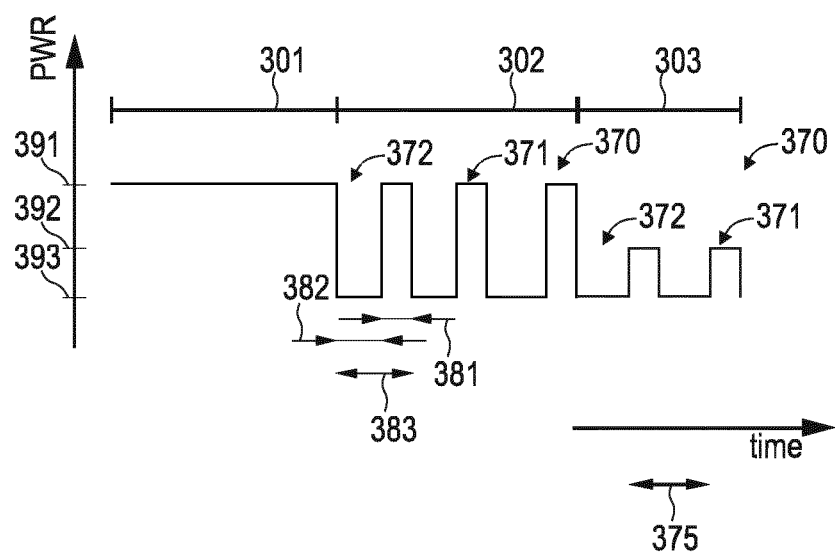

FIG. 6 illustrates aspects with respect to transitioning between the different network registration modes 301-303. Furthermore, FIG. 6 illustrates aspects of employing DRX cycles 370. FIG. 6 also illustrates aspects with respect to receiver states associated with the network registration modes 301-303 and ON and OFF durations 371, 372 of the DRX cycle. It is possible to employ such techniques in the various examples described herein with respect to communication of paging signals.

Specifically, FIG. 6 illustrates the power consumption of the wireless interface 1012 of the UE 101 as a function of time. First, the UE 101 operates in the connected mode 301. This causes a persistent power consumption at a high level, because the receiver persistently operates in the active state 391. The active state 391 is associated with a certain power consumption. Then, in order to reduce the power consumption, the connected mode 302 employing DRX is activated. Here, the ON durations 371 and the OFF durations 372 of the receiver—selectively operating in the active state 391 and the inactive state 393—are illustrated. FIG. 6 illustrates the length 381 of the ON duration 371 and the length 382 of the OFF duration 372. Also, the periodicity 383 of the DRX cycle 370 is illustrated.

To further reduce the power consumption, next, the idle mode 303 is activated. This is accompanied by releasing the data connection 189. Again, the idle mode 303 employs a DRX cycle 370 including ON durations 371 and OFF durations 372. The ON durations 371 in idle mode 303 are associated with a lower power consumption if compared to the on durations 371 in connected mode 302, because in the idle mode 303, the capability of the receiver, now operating in the active state 392, can be reduced if compared to the connected mode 302. During idle mode 303 when in active state 392, the receiver only expects reception of paging signals.

The states 391-393 are examples only; other implementations are conceivable.

Figure 7:
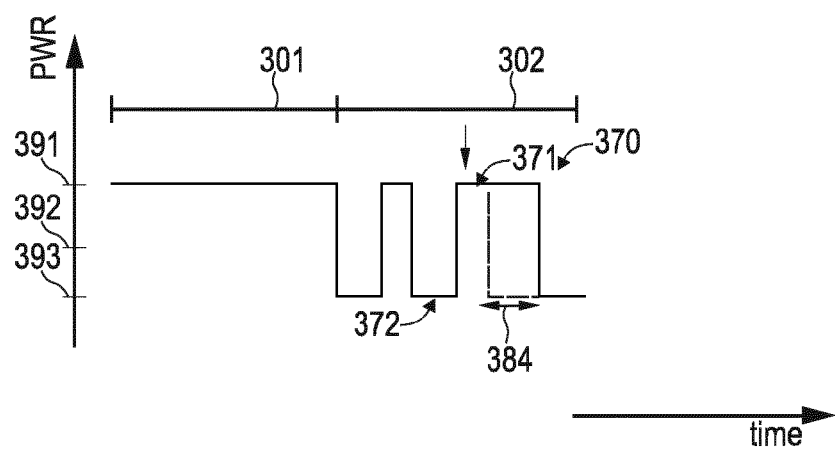

FIG. 7 illustrates aspects with respect to an inactivity timer 384 of the DRX cycle 370. Upon receiving a signal (vertical arrow in FIG. 7) on the PDCCH 261, the inactivity timer 384 is triggered. The inactivity timer 384 temporarily extends the particular ON duration 371 during which the signal is received.

Figure 8:
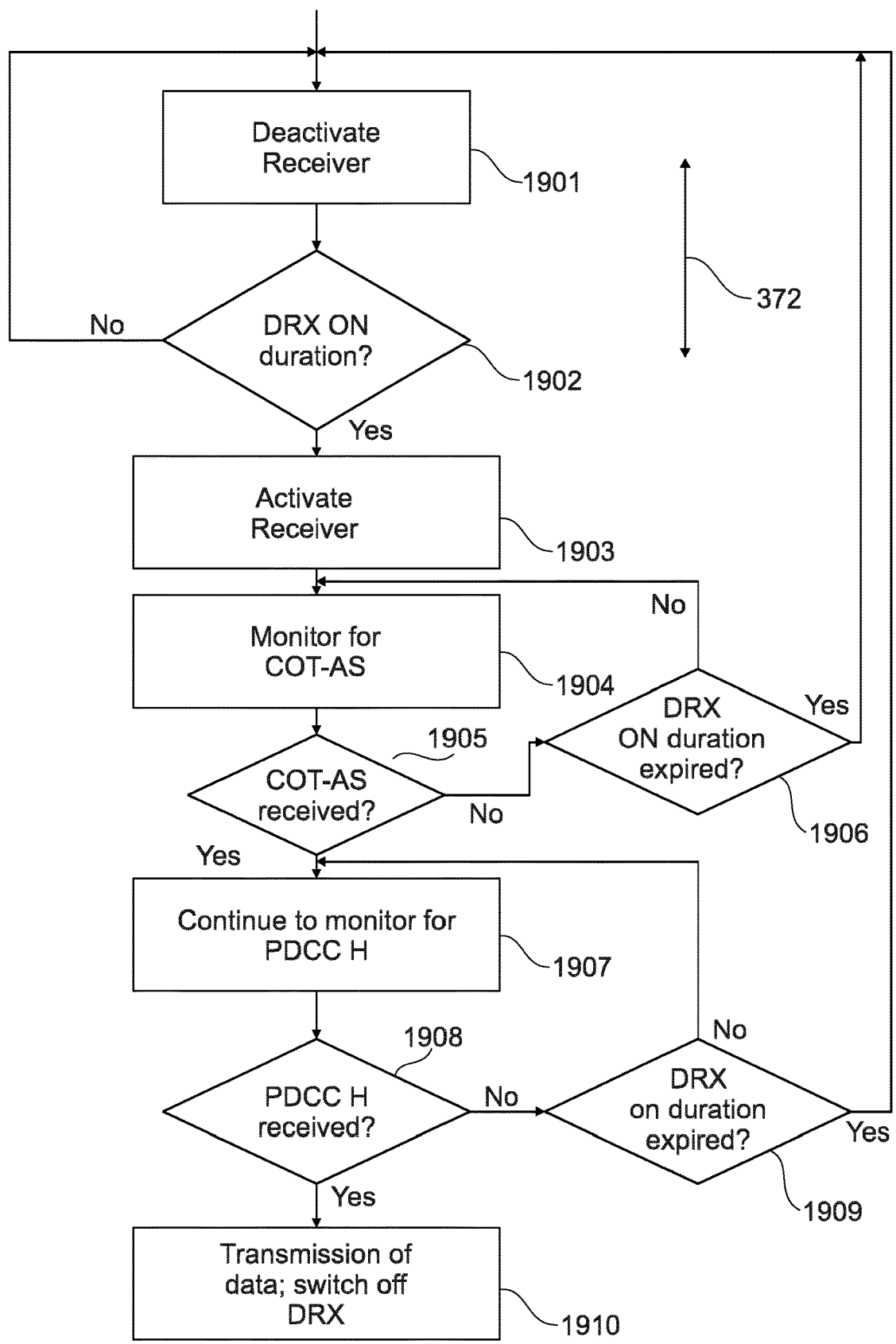
FIG. 8 is a flowchart of a method according to various examples, wherein FIG. 8 relates to monitoring an open spectrum in accordance with a DRX cycle according to various examples.

FIG. 8 is a flowchart of a method according to various examples. FIG. 6 illustrates aspects with respect to the channel acquisition on the open spectrum using a COT-AS. FIG. 6 illustrates aspects with respect to monitoring for the COT-AS in accordance with a DRX cycle. These techniques can be employed in the various examples described herein.

At box 1901, at the beginning of an OFF duration 372 of the DRX cycle 370, at least a part of the receiver of the wireless interface 1102 of the UE 101 (cf. FIG. 2) is deactivated. Accordingly, the wireless interface 1102 then operates in the inactive state 393 (cf. FIG. 6).

At box 1902, it is checked whether or not the next on duration 371 of the DRX cycle 370 begins. If this is not the case, the wireless interface 1102 is continued to be operated in the inactive state 393. Otherwise, the receiver is activated and the wireless interface 1102 is operated in the active state 391 (cf. FIG. 6), box 1903.

This enables the UE 101 to monitor the open spectrum for COT-ASs, at box 1904. This can include attempting to receive on certain time-frequency resource elements 210 of the time-frequency resource grid 200 that are reserved for COT-Ass (cf. FIG. 5, reservations 269).

Accordingly, at box 1905 it is checked whether or not the COT-AS is received. If this is not the case, then at box 1906 it is checked whether or not the ON duration 371 of the DRX cycle 370 has expired. If this is not the case, then the UE 101 continues to monitor for the COT-AS, by re-executing box 1904. Otherwise, the receiver is deactivated by re-executing box 1901.

If, at box 1905 it is judged that the COT-AS has been received, the method commences with box 1907. Then, the UE continues to monitor for signals on the PDCCH 261 (cf. FIG. 5). This can include blind decoding of the PDCCH 261, e.g., to detect a DCI. If at box 1908 it is then judged that the DCI has been received, the method commences with box 1910. Here, transmission of data on the PDSCH 262 and/or on the PUSCH can be implemented. This can be in accordance with triggering of the inactivity timer 384 (cf. FIG. 7). This can be during the COT associated with the COT-AS received at 1904. Alternatively, it would also be possible that the UE 101 performs an additional LBT procedure, to obtain a COT. It would be possible to transition from the connected mode 302 to the connected mode 301 (cf. FIG. 4).

On the other hand, if, at box 1908, it is judged that no data has been received on the PDCCH 261 that is related to the UE 101, the method commences with box 1909. Here, it is checked whether or not the DRX ON duration 371—possibly prolonged by the inactivity timer 384—has expired. If not, the method commences by re-executing box 1907 and the blind decoding of the PDCCH 261 continues. Otherwise, the receiver is deactivated by re-executing box 1901, and the next OFF duration 372 commences.

Figure 9:
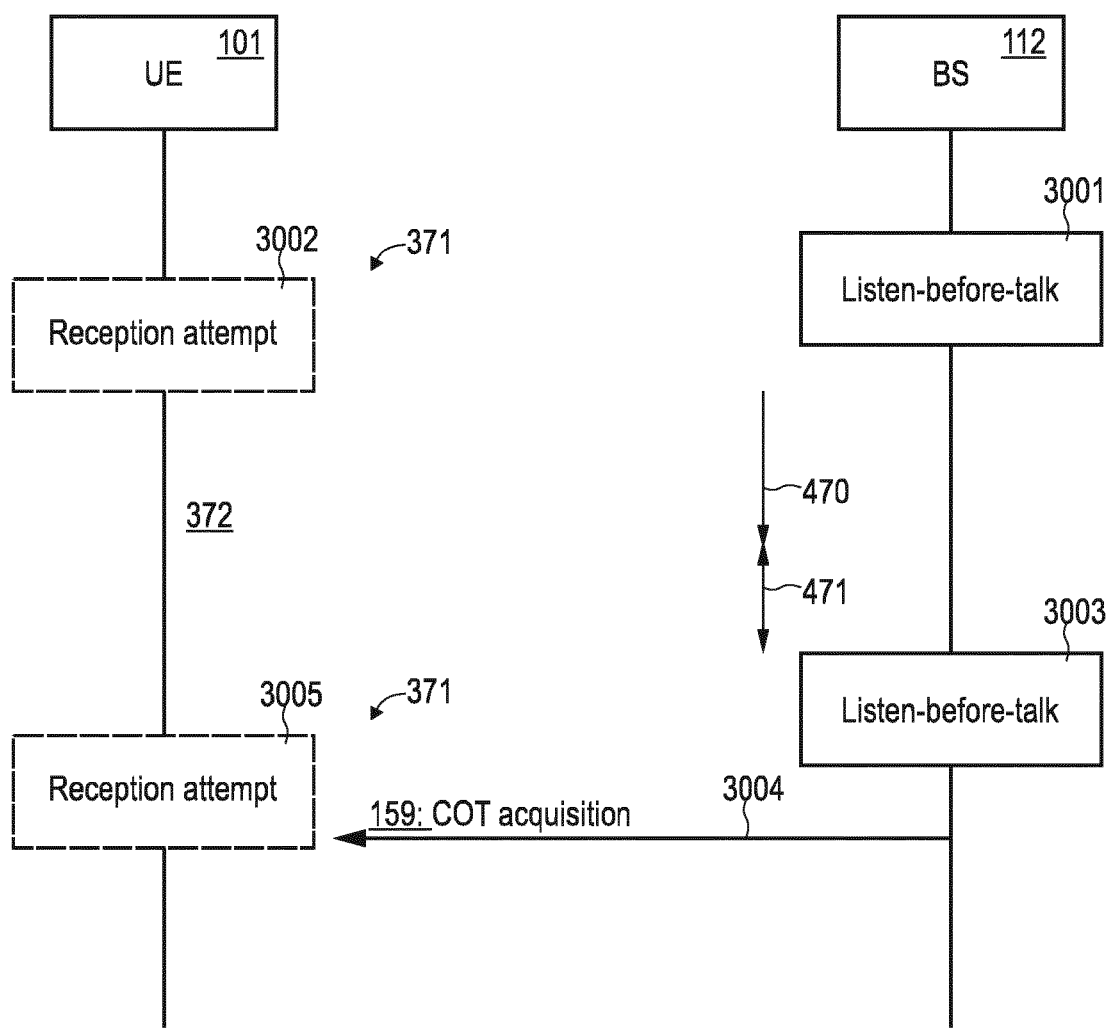

FIG. 9 is a signaling diagram illustrating communication between the UE 101 and the BS 112 according to various examples. FIG. 9 illustrates aspects in connection with the channel acquisition on the open spectrum using a COT-AS. Thus, the scenario FIG. 9 corresponds to the scenario of FIG. 8.

Initially, at box 3001, the BS 112 performs a LBT procedure. The LBT procedure of box 3001 could be time-aligned with an ON duration 371 of the UE 101. Thus, at box 3002, the UE monitors the open spectrum for a COT-AS to be transmitted by the BS 112.

In the scenario of FIG. 9, the LBT procedure at box 3001 fails. Accordingly, the BS 112 implements a back off 470 before implementing a new LBT procedure at box 3003. Note that the LBT procedure at box 3003 is further delayed beyond the end of the back-off 470, because it is time aligned with the next ON duration 370 of the DRX cycle 370: see time offset 471. The UE 101, at box 3005, again monitors the open spectrum for the COT-AS 159. The LBT procedure at box 3003 is successful and, accordingly, at 3004, the BS 112 transmits the COT-AS 159 which is received by the UE 101.

In FIG. 9, box 3002 and box 3005 corresponds to box 1904 of FIG. 8.

As will be appreciated from the explanation of FIG. 9 above, due to the timing constraint imposed by the DRX cycle 370, timely delivery of data is delayed. In particular, the subsequent LBT procedure at box 3003 is delayed beyond the back of duration 470 in accordance with the offset 471, until the start time of the next on duration 371. Accordingly, according to various examples described herein, it is possible to switch between multiple settings of the DRX cycle 370. Then, different settings can be activated such that timely delivery of data is facilitated. A corresponding strategy is explained in further detail in connection with FIG. 10.

Figure 10:
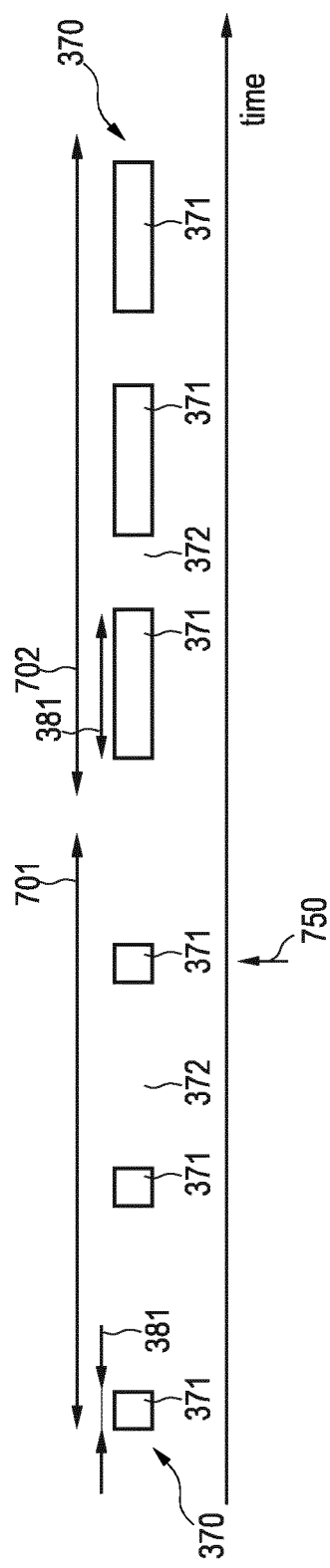
FIG. 10 schematically illustrates switching between multiple settings of a DRX cycle upon a trigger criterion being met, according to various examples.

FIG. 10 schematically illustrates aspects with respect to switching between 2 settings 701, 702 of the DRX cycle 370 the first setting 701 has a shorter length 381 of the ON durations 371, if compared to the length 381 of the ON durations 371 of the second setting 702.

The switching from the setting 701 to the setting 702 is in response to a trigger criterion 750 being met. The trigger criterion is associated with the UE 101 monitoring the open spectrum for the COT-AS 159. More specifically, the trigger criterion 750 can define one or more events that occur when monitoring the open spectrum. Then, if the one or more events are detected, the trigger criterion can be judged to be met.

As a general rule, various trigger criteria are conceivable. Examples would include types of signals received, reception timing or reception frequency events, and/or statistics of received signals or reception timings across multiple periods of the DRX cycle 370, etc.

By implementing the second setting 702 having a longer length 381 of the ON duration 371, it may be possible to facilitate timely delivery of data even via the open spectrum. For example, in some scenarios, it would be possible that the ON duration 371 has a length 381 that is longer than the back-off time 470 (cf. FIG. 9). Then, two LBT procedures could be performed within a single ON duration 371. This, however, is only one example in different strategies are available for adjusting the setting 702 vis-à-vis the setting 701 to facilitate timely delivery. For example, the strategies may include shortening the periodicity 383 of the DRX cycle 370, or increasing the inactivity timer duration 384, etc. Note that—in addition to or alternatively to—timely delivery of the data, another decision criterion to be taken into account when choosing the appropriate setting 701, 702 of the DRX cycle 370 would be power consumption of the UE 101. For example, as has been explained in connection with FIGS. 6-7 above, a longer length 381 of the ON duration 371 tends to increase the power consumption, because the active states 391, 392 are activated longer.

Figure 11:
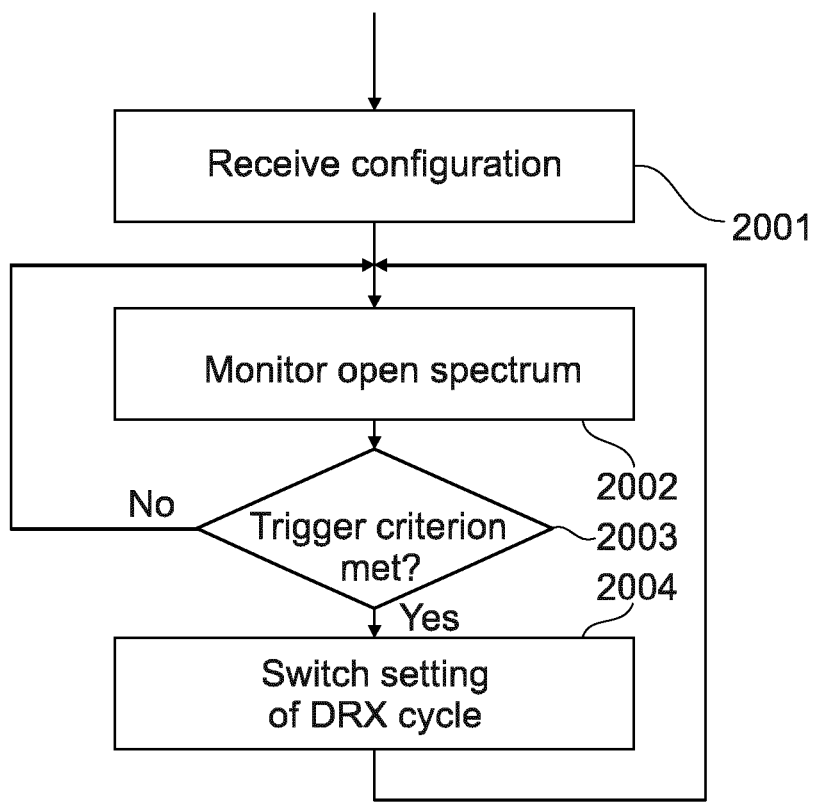
FIG. 11 is a flowchart of a method according to various examples.

FIG. 11 is a flowchart of a method according to various examples. The method of FIG. 11 may be executed by a UE.

For example, the method of FIG. 11 could be executed by the UE 101. More specifically, the method of FIG. 11 could be executed by the control circuitry 1011, 1015 of the UE 101 (cf. FIG. 2). For instance, the processor 1011 could load program code from the memory 1015 and execute the program code to implement the method of FIG. 11.

FIG. 11 illustrates aspects with respect to a dynamic and flexible configuration of monitoring and open spectrum. Such dynamic and flexible configuration enables to tailor the monitoring to the particular circumstances. For example, the monitoring could be tailored to UE-specific circumstances. It would also be possible that the monitoring is tailored for time-dependent circumstances. UE-specific circumstances could pertain to UE-specific power requirements/power restrictions, UE-specific restrictions of the receiver hardware, and so on. Time-dependent circumstances could pertain to changing communication quality on the open spectrum, a changing communication load on the open spectrum, etc.

At box 2011, a configuration for monitoring the open spectrum is received at the UE. The configuration is received from the network.

As a general rule, the configuration could define a time-domain and/or frequency-domain behavior of the UE when monitoring the open spectrum.

For example, the configuration could be received as part of a control message communicated on the PDSCH 262 while the UE operates in one of the connected modes 301, 302 (cf. FIG. 4 and cf. FIG. 5). It would also be possible that the configuration is broadcasted by the network. UE groups may be defined, e.g., based on a UE category. Then different configurations may be applicable to different UE categories.

Next, at box 2002, the UE monitors the open spectrum in accordance with the configuration is received at box 2001, and further in accordance with a DRX cycle (details with respect to the DRX cycle 370 have been explained above in connection with FIGS. 6-7).

At box 2002, the UE may monitor for various signals. For instance, the UE may monitor for a COT-AS (cf. FIG. 2, where the COT-AS 159 has been explained). The UE may alternatively or additionally monitor the open spectrum for data on the PDCCH 261 addressed to the UE. This can include blind decoding, e.g., to detect a match of the cyclic redundancy check sum coded in accordance with a UE-specific identity. The UE could also monitor, e.g., the PDSCH 262 in accordance with a DCI provided on the PDCCH 262.

Next, at box 2003, the UE determines whether or not at least one trigger criterion is met. Box 2003 is based on the monitoring. I.e., the trigger criterion or the trigger criteria that can be detected at box 2003 are defined with respect to certain events that are detected based on the monitoring at box 2002.

As a general rule, various kinds and types of trigger criteria are conceivable. For example, the trigger criterion could be defined with respect to reception of the COT-AS 159. For example, the trigger criterion may define one or more reference events and the UE can check whether or not the one or more reference events are detected. This detection can be based on the monitoring.

In case the UE determines that at least one of the one or trigger criteria is met, box 2004 is executed. At box 2004, the UE switches to another setting of the DRX cycle. The UE then continues to monitor at box 2002 based on the newly activated setting of the DRX cycle.

Figure 12:
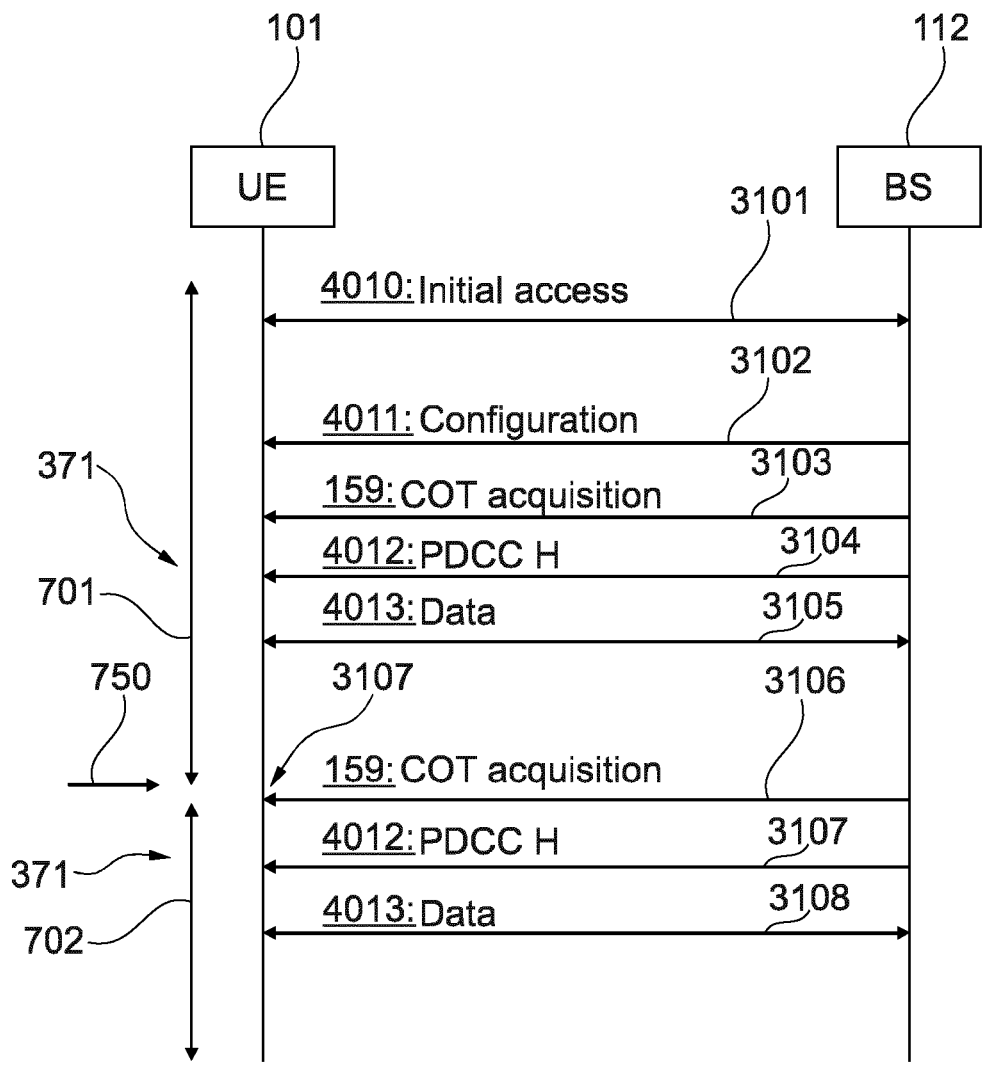
FIG. 12 is a signaling diagram of communication between the UE and the BS according to various examples.

FIG. 12 is a signaling diagram illustrating communication between the UE 101 and the BS 112. FIG. 12 illustrates aspects with respect to switching between the different settings 701 and 702 of the DRX cycle 370. FIG. 12 illustrates signaling that can be used to implement the method of FIG. 11.

At 3101, initial access signaling 4010 is exchanged between the UE 101 and the BS 112. For example, a UE context can be set up at the AMF 131 (cf. FIG. 3), including a UE identity for encoding communication on the PDCCH 261. Operation in one of the connected modes 301, 302 can thereby be triggered.

At 3102, the BS 112 transmits the configuration 4011 (cf. FIG. 11, box 2001) and the UE receives the configuration 4011.

Next, at 3103, the BS 112 (e.g., after a successful LBT procedure, not illustrated in FIG. 12 for sake of simplicity; but explained in connection with FIG. 9) transmits the COT-AS 159. This is while the UE 101 is monitoring the open spectrum, e.g., during the on duration 371 of the DRX cycle 370. The UE 101 receives the COT-AS 159 at 3103 and accordingly continues to monitor the open spectrum for a PDCCH transmission 4012, at 3104 (also compare FIG. 8: box 1904-1905, 1907). The PDCCH transmission 4012 can include a DCI. The DCI can include a downlink scheduling assignment or an uplink scheduling grant. Accordingly, at 3105, data 4013 is transmitted on the PDSCH 262 or the PUSCH, respectively, in accordance with the downlink scheduling assignment or the uplink scheduling grant.

At 3106, BS 112 again attempts to transmit the COT-AS 159. The UE 101 monitors the open spectrum.

The monitoring at 3103 and 3104 and 3106 is in accordance with the first setting 701 of the DRX cycle 370.

At 3107, a trigger criterion 750 is met, e.g., while the UE 101 monitors the open spectrum.

Accordingly, the second setting 702 of the DRX cycle 370 is activated. Using the second setting 702, the UE 101 monitors for a PDCCH transmission 4012 for 3107. Again, at 3108, data 4113 is transmitted.

The UE 101 does not need to inform the BS 112 or another node of the network 100 of the switching. Nonetheless, the BS 112 can follow and be aware of the current setting even without explicit re-configuration signaling commands. The BS 112 is aware of the switching and the current setting, since the configuration of monitoring the open spectrum is either preconfigured in the standard or signaled from the network, see configuration 4011. And the BS 112 is further aware of when the downlink transmissions—e.g., of the COT-AS 159—succeed: for instance, then the subsequent PDCCH transmission 4012 and transmission of the data 4013 can be successful. Thus, the BS 112 has the same information as the UE 101 and can mirror the switching between different configurations for monitoring the open spectrum. Thus, upon switching from the first setting 701 to the second setting 702, the BS 112 can adjust its transmission timings in accordance with the newly activated setting 702.

As a general rule, various options are available for implementing the configuration 4011 (cf. FIG. 12: 3102; and cf. FIG. 11: box 2001). For example, the configuration 4011 may include the at least one trigger criteria for said switching between the multiple settings 701-702 of the DRX cycle 370. In other words, it would be possible that the kind and type of trigger criterion or trigger criteria 750 is/are network-configured. For example, the network could define or set up one or more of the trigger criteria 750.

Another option for implementing the configuration 4011 relates to an activation duration of one or more of the settings 701-702 of the DRX cycle 370. Accordingly, it would be possible that the duration of activation of, e.g., of the setting 702, is network configured. For instance, once the UE 101 switches from the setting 701 to the setting 702, a respective activation timer for the setting 702 may be initialized. The initialization value of this timer could be network configured by the configuration 4011.

Yet another option for implementing the configuration 4011 relates to one or more parameters of the settings 701-702 and/or to values of the parameters of the settings 701-702. In detail, each setting may be characterized by a set of parameters or, more precisely, the values that the parameters take. The configuration 4011 may be indicative of the parameters that are dynamically adjusted. In particular, it would be possible that the configuration 4011 is indicative of the values of these parameters. As a general rule, the values of various parameters may be subject to a dynamic adjustment when switching between the settings. To give a few examples, it would be possible that the one or more parameters include at least one of a periodicity of the DRX cycle (cf. FIG. 6: periodicity 383), or an inactivity timer of the DRX cycle (cf. FIG. 7: inactivity timer 384). Another option would be that the configuration includes the ON duration and/or the OFF duration of the DRX cycle (cf. FIG. 6: on duration 381, and OFF duration 382).

Depending on the number of settings, a different count of such values for the parameters may be available. For example, if they are to settings, then two values of the ON duration may be available, each value being associated with one of the two settings. If there are three settings, then three values of the ON duration may be available, each value being associated with one of the three settings. According to various examples, the configuration includes three or more values of the ON duration of the DRX cycle. Thereby, a default ON duration (according to the first setting) may be either extended (according to the second setting) or shortened (according to the third setting), e.g., depending on the particular trigger criterion. Such an example as explained in further detail in connection with the example of FIG. 13.

Figure 13:
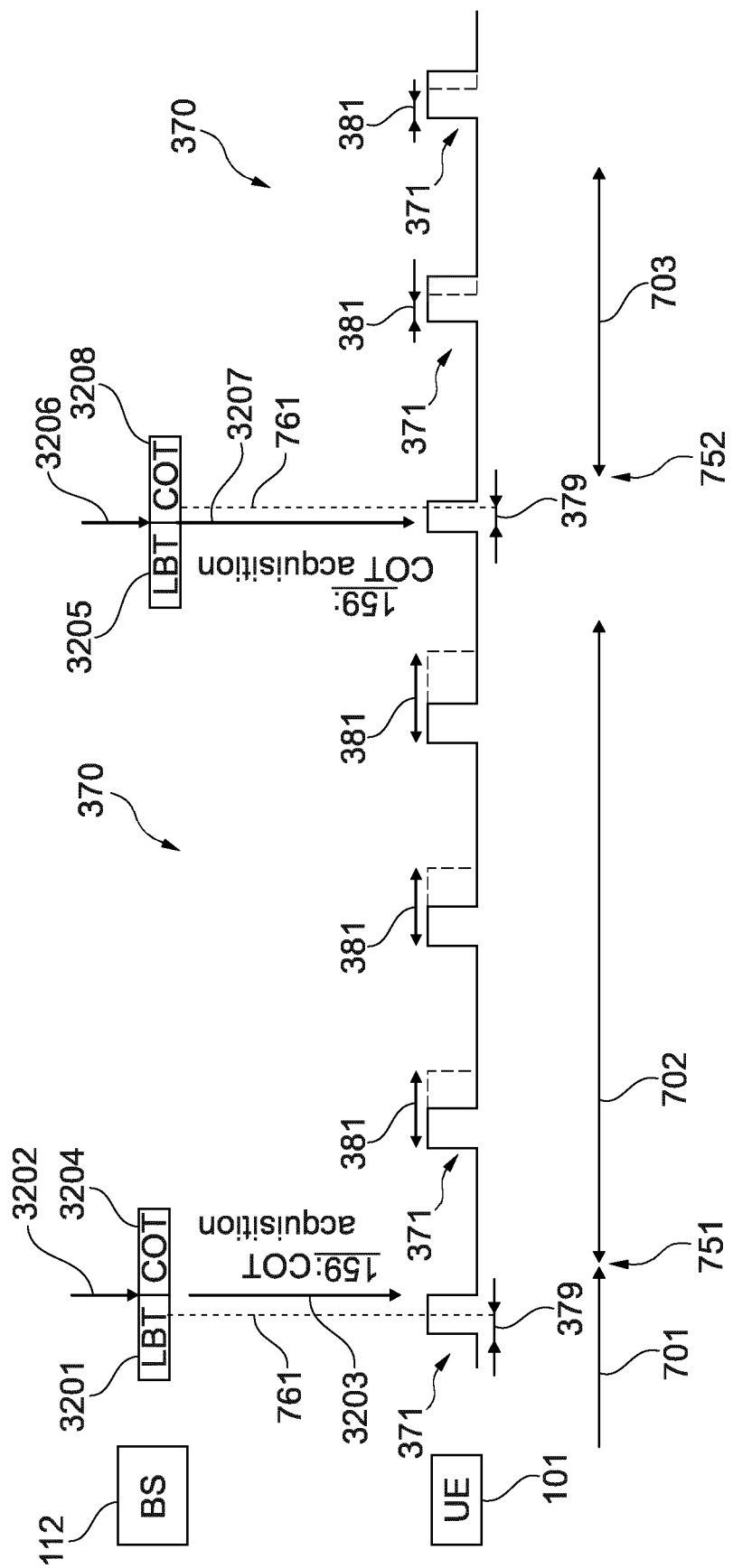
FIG. 13 schematically illustrates switching between multiple settings of a DRX cycle upon a trigger criterion being met according to various examples.

FIG. 13 schematically illustrates communication between the BS 112 and the UE 101. FIG. 13 illustrates aspects with respect to various trigger criteria 751-752 that trigger switching between different settings 701-703 of a DRX cycle 370 used by the UE 101 to monitor the open spectrum.

Initially, the UE 101 monitors the open spectrum in accordance with the DRX cycle 370 having the first setting 701. At 3201, the BS 112 performs a LBT procedure. At 3202, the LBT procedure is successful. Accordingly, at 3203, the BS transmits a COT-AS 159. This is during an ON duration 371 of the DRX cycle 370 of the UE 101. Accordingly, the UE 101 receives the COT-AS 159 at 3203. The COT-AS 159 is indicative of the COT 3204 during which the BS may transmit, e.g., on the PDCCH 261 (cf. FIG. 12: 3104 and 3107; this is not illustrated in FIG. 13 for sake of simplicity).

In the example of FIG. 13, the trigger criterion 751 is defined with respect to a reference reception timing of the COT-AS 159. In other words, when checking whether or not the trigger criterion 751 is met, a comparison is made between the actual reception timing of the COT-AS 159 and the reference reception timing of the COT-AS 159. Depending on such comparison, it is judged whether or not one or more events are fulfilled; in the affirmative, the trigger criterion 751 is met. There are various options to define the reference reception time and different events may be accordingly detected.

In the example of FIG. 13, the reference reception timing is relatively defined with respect to the ON durations 371 of the DRX cycle 370 of the UE 101. In particular, a reference timing threshold 761 (dashed-dotted line in FIG. 13) for the reception of the COT-AS 159 is offset by a time offset 379 from the start time of the ON duration 371 of the DRX cycle 370. Then, when determining whether or not the trigger criterion 751 is met or is not met, a comparison can be made between the reception time of the COT-AS 159 and the reference timing threshold 761. In the example of FIG. 13, the reception time of the COT-AS 159 is after the reference timing threshold 761, which defines a corresponding event. Accordingly, a trigger criterion 751 is met.

The UE 101 determines that the trigger criterion 751 is met and in accordance with this determining, switches from the setting 701 to the setting 702 of the DRX cycle 370. Previously received configuration 4011 includes a value for the length 381 for the ON duration 371 of the DRX cycle 370. As illustrated in FIG. 13, upon the trigger criterion 751 being met, the setting 702 is activated and, accordingly, the length 381 of the ON durations 371 is increased if compared to the length 381 of the ON durations 371 according to the setting 701 (this increase in the length 381 of the ON duration 371 illustrated in FIG. 13 by the dashed lines).

As a general rule, it would be possible that the configuration 4011 includes multiple trigger criteria. Then, the switching between the two or more settings of the DRX cycle 370 depends on the detected one of the one of the multiple trigger criteria. Different trigger criteria can trigger switching to different settings. In other words, if a first one of the multiple trigger criteria is detected, then a switching may be implemented to a first setting. Differently, if a second one of the multiple trigger criteria is detected, then a switching may be implemented to a second setting which is different from the first setting. Thus, in other words, the setting to be activated may depend on the particular trigger criterion that is detected.

An example implementation of such multiple trigger criteria is also illustrated in FIG. 13. In FIG. 13, the first trigger criterion 751 is defined as the event of receiving the COT-AS 159 after the reference timing threshold 761. In FIG. 13, a second trigger criterion 752 is defined as the event of receiving the COT-AS 159 before the reference timing threshold 761.

In particular, at 3205, a further LBT procedure is performed by the BS 112. Then, at 3206, the LBT procedure is successful and, accordingly, at 3207, the BS 112 transmits a COT-AS 159. The COT-AS is transmitted before the reference timing threshold 761. Accordingly, the trigger criterion 752 is met.

Because the trigger criterion 752 is met, the UE 101 switches to the setting 703 of the DRX cycle 370.

The setting 702 defines a length 381 of the ON durations 371 that is shorter than the length 381 of the on durations 371 of the setting 701, as well as of the setting 702.

In the above identified scenario, the trigger criterion is defined based on a one-time event: i.e., for a single ON duration 371, it is checked whether or not the COT-AS 159 is received before or after the reference timing threshold 761. In other examples, it would be possible to use a reference reception timing that is defined using an event relying on a statistic across multiple periods of the DRX cycle 370. In this regard, a sliding window approach may be used that defines the particular periods of the DRX cycle 370 across which the averaging is executed (averaging windows). Thus, for example, could be checked whether or not the COT-AS 159 is received after the reference timing threshold 761 for a number of times N across M most recent periods (sliding averaging window) of the DRX cycle, wherein N and M can be predefined values specified by the configuration 4011 or can be fixedly set. Generally, such statistics cannot only be applied to the specific implementation using the reference timing threshold 761, but also with respect to other reference reception timings. For example, other reference reception timings could include a reference reception rate of the COT-AS. For example, the reference reception rate could define the fraction K/M, wherein K is the count of on durations 371 of the DRX cycle 370 within M periods of the DRX cycle for which the COT-AS 159 is received. This again corresponds to considering a statistic. Then a comparison can be made whether or not the actual reception rate is higher or lower than the reference reception rate, when determining whether or not the trigger criterion is met.

Figure 14:
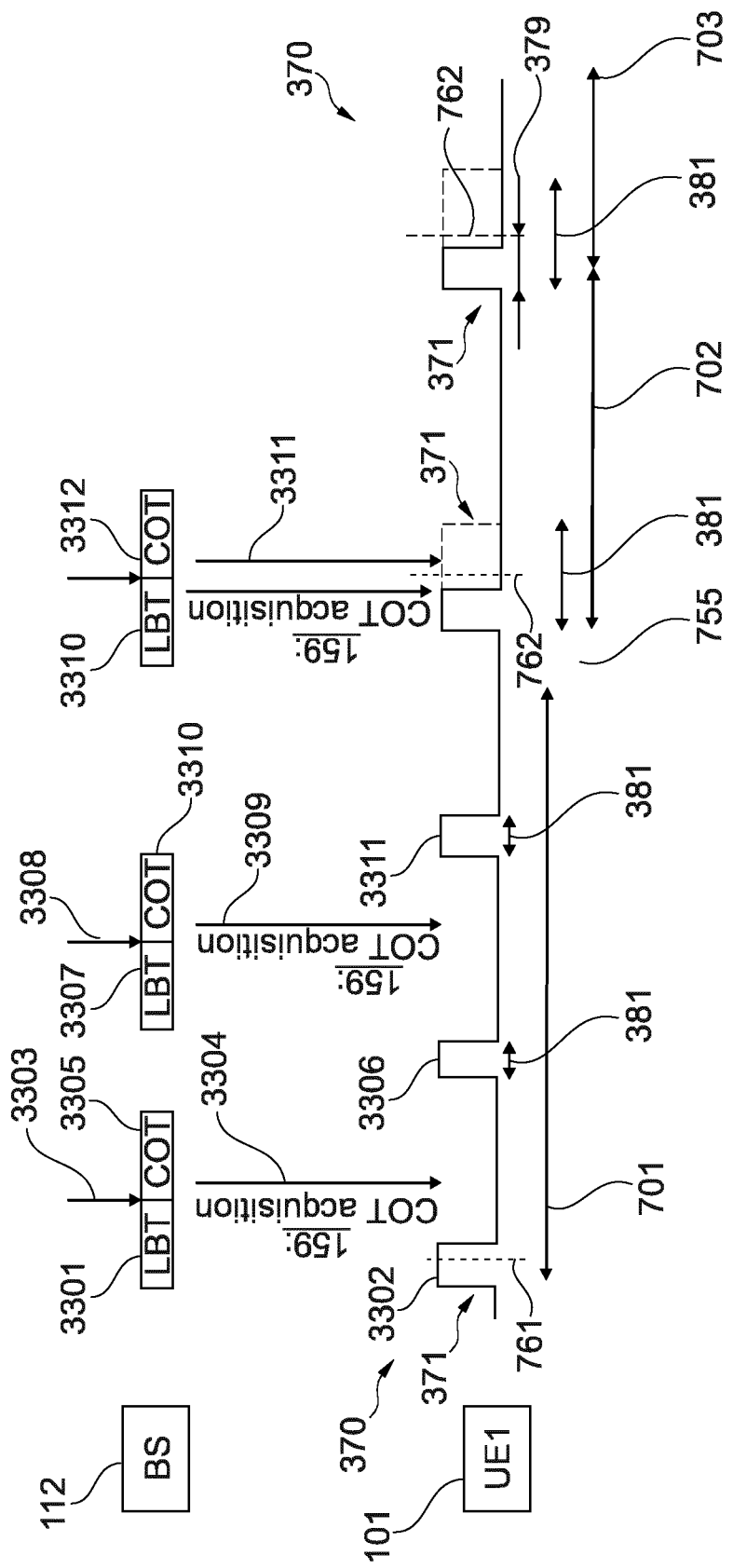
FIG. 14 schematically illustrates switching between multiple settings of a DRX cycle upon a trigger criterion being met according to various examples.

An example with respect to such an implementation of the trigger criterion 755 using a reference reception rate is illustrated in FIG. 14. Here, at 3302, 3306, and 3311, the UE 101 monitors the open spectrum in accordance with the DRX cycle 370 having the setting 701. The LBT procedures at 3301 and 3307 are, respectively, successful at 3303 and 3308. Accordingly, the COT-AS 159 is transmitted at 3304 and 3309, respectively, which is after the end of the respective ON duration 371. The UE 101 cannot receive the COT-AS 159 (note that in other examples the BS 112 may refrain altogether from transmitted the COT-AS 159, because it detects that the UE 101 has re-activated the OFF duration 372; however, if the BS 112 intends to transmit to one or more further UEs, then the COT-AS 159 may be transmitted to those one or more further UEs).

Thus, for three ON durations 371 at 3302, 3306, and 3311, the UE 101 does not receive the COT-AS 159; thus, a trigger criterion 755 defined as a reference reception rate is met. Here, more specifically, the trigger criterion 755 is defined by a statistics, i.e., by specifying that over the course of three subsequent on durations 371 of the DRX cycle 370 having the first setting 701, the COT-AS 159 is not received once. This event occurs in FIG. 14 after 3311. Upon the trigger criterion 755 being met, the UE 101 continues to monitor the open spectrum in accordance with the second setting 702 having the longer length 381 of the ON durations 371 (dashed lines in FIG. 14). Accordingly, the COT-AS 159 transmitted at 3311 after a successful LBT procedure at 3310 is received.

Note that in the example of FIG. 14, also the trigger criterion is changed: the threshold 762 associated with the monitoring in accordance with the setting 702 has a longer offset 379 from the beginning of the ON durations 371 if compared to the threshold 761. This can be in accordance with the configuration 4011. More generally, the configuration 4011 can comprise the trigger condition, e.g., the reference timing threshold 761, 762 associated with the respective setting 701, 702.

Figure 15:
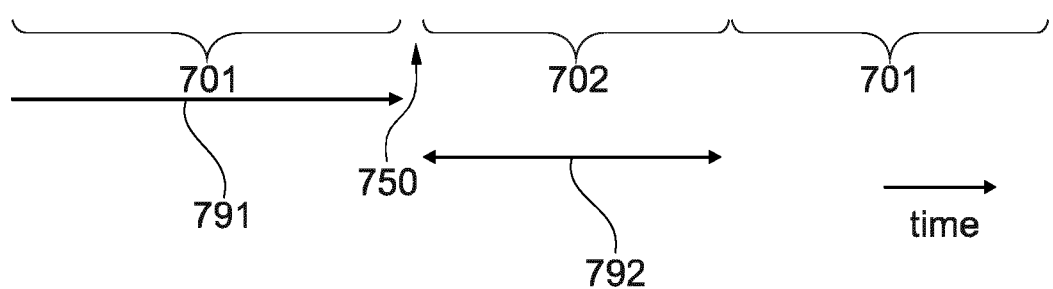
FIG. 15 schematically illustrates an activation duration of a setting of a DRX cycle according to various examples.

FIG. 15 schematically illustrates aspects with respect to switching between different settings 701-702 of the DRX cycle 370. Initially, the setting 701 is activated. An activation duration 791 of the setting 701 is illustrated. Then, the trigger criterion 750 is met, and a switching from the setting 701 to the setting 702 is implemented. The setting 702 is then activated for an activation duration 792, before switching back to the setting 701.

According to various examples, it would be possible that the configuration 4011 includes the activation duration 792 of the setting 702. For example, the activation duration 792 could be defined from switching to the setting 702, to a certain count of periods of the DRX cycle 370. For example, after a number of P counts of the DRX cycle 370, the activation duration 792 may expire.

The activation duration 792 could also be defined from switching to the setting 702 to a transition of the UE between two of the network registration modes 301-303. For example, the activation duration 792 could be defined from switching to the setting 702 until a transition from the DRX connected mode 302 to the DRX idle mode 303 (cf. FIG. 4). In such a scenario, the setting 702 would effectively remain activated until a more transition between one of the network registration modes 301-303 occurs.

The activation duration 792 could also be defined in a global timing reference, e.g., the timing reference of the transmission frames 201-203 (cf. FIG. 5). Then, the activation duration 792 could be defined from switching to the setting 702 to a point in time specified in this global timing reference.

Figure 16:
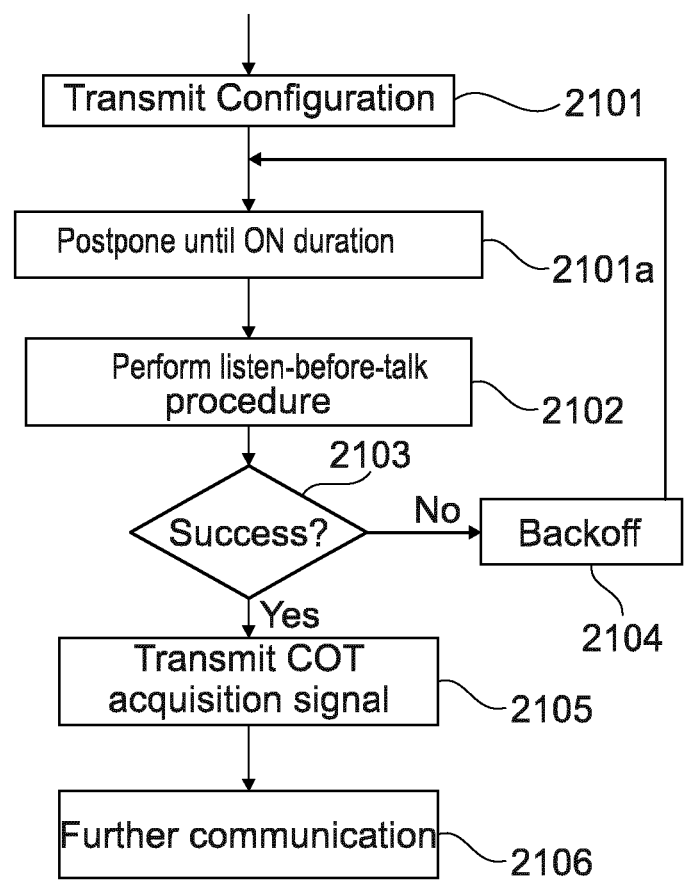
FIG. 16 is a flowchart of a method according to various examples.

FIG. 16 is a flowchart of a method according to various examples. For example, the method of FIG. 16 could be executed by an access node of the network. For example, the method of FIG. 16 could be executed by a BS of a cellular network. More specifically, it would be possible that the method of FIG. 16 is executed by the BS 112 (cf. FIG. 1 and FIG. 2). In particular, the method of FIG. 16 could be executed by the control circuitry 1121, 1125 of the BS 112.

At box 2101, the access node transmits a configuration for monitoring an open spectrum to a UE. For example, the access node may determine the configuration or may receive the configuration from another node, e.g., a core network node of a core of a cellular network. Examples of such configuration have been explained above, e.g., in connection with FIG. 12: configuration 4011.

Then, at box 2102, the access node performs a LBT procedure. This can include sensing in energy level on the open spectrum. This can include attempting to decode transmissions on the open spectrum.

For instance, the LBT procedure of box 2102 may be delayed to be contemporaneous with an ON duration of a DRX cycle implemented at the UE; box 2101a. For this, the BS may track the switching between different settings of the DRX cycle at the UE.

At box 2103, it is judged whether or not the LBT procedure previously executed at box 2102 has been successful. For example, this could involve a comparison between the sensed energy level with a reference threshold. If the sensed energy level is below the reference threshold, then it can be judged that the LBT procedure has been successful.

If at box 2103, it is judged that the LBT procedure has not been successful, then at box 2100 and for a back-off is implemented, before a further LBT procedure is performed by another execution of box 2102.

If the LBT procedure is not successful, a back-off is implemented at 2104 (cf. FIG. 9, back-off 470).

If the LBT procedure has been successful, the method commences with block 2105. At box 2105, a COT-ASs transmitted to the UE (cf. FIG. 2: COT-AS 159). The transmission of the COT-AS can be in accordance with a DRX cycle of the UE and the configuration transmitted at box 2101.

More specifically, in subsequent optional box 2106, there can be further communication. For example, a DCI may be transmitted on the PDCCH during the COT and it would then be possible to transmit on the PDSCH or PUSCH, in accordance with scheduling information in the DCI (cf. FIG. 12: 3104-3105 and 3107-3108).

Figure 17:
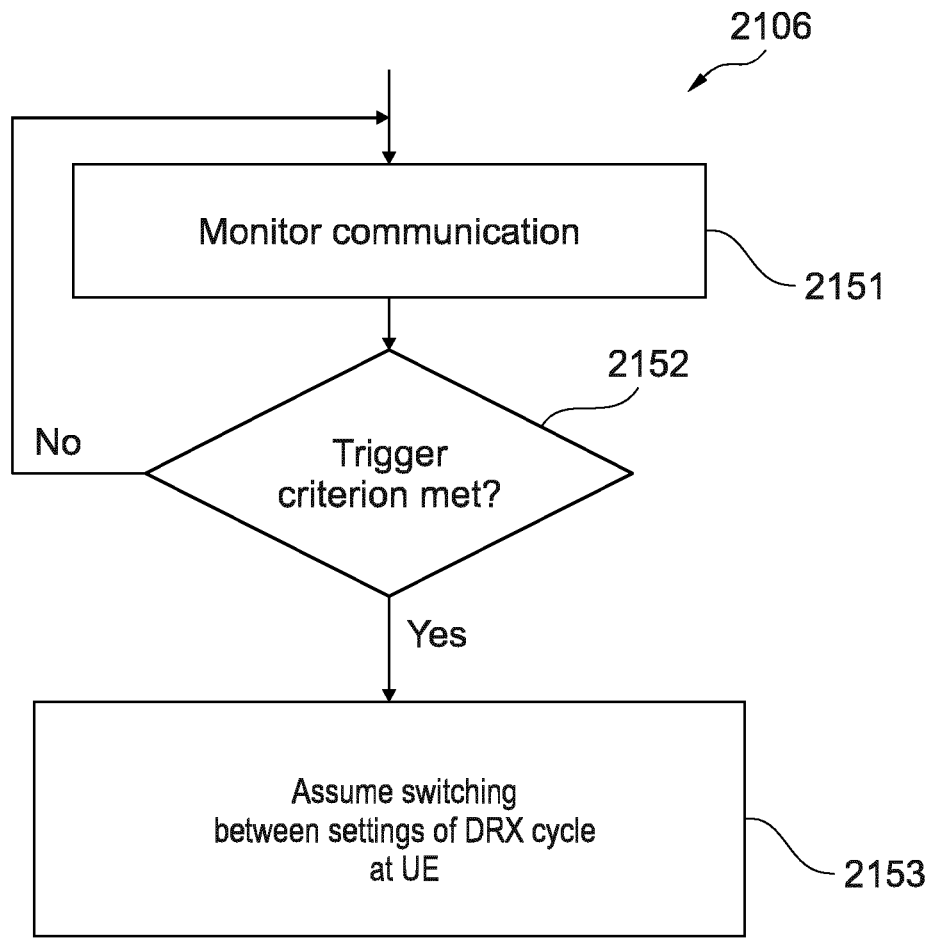
FIG. 17 is a flowchart of a method according to various examples.

FIG. 17 illustrates an optional method that can be executed as part of box 2106.

As illustrated in FIG. 17, the communication at box 2106 can be monitored by the BS at box 2151 to determine, at box 2152, based on said monitoring whether or not, at the UE, one or more trigger criteria have been met. Then, if a trigger criterion is met, the BS may switch between a respective setting of the DRX cycle at the UE. Thereby, the BS is able to track the switching between multiple settings of the DRX cycle at the UE. I.e., the BS can determine whether or not the UE has switched between two settings. Thus, the BS can adjust the transmission accordingly, box 2153. The BS can transmit further signals in accordance with the active settings at the UE. For example, this may include further transmission on the PDCCH or PUSCH/PDSCH transmission. This may also regard transmission of further COT-Ass 159, see box 2101a, cf. FIG. 16.

To clarify further how the BS is able to track the monitoring of the open spectrum at the UE 101 and be aware of the currently activated setting 701, 702 of the DRX cycle 370 used by the UE 101 to monitor the open spectrum: The UE behavior shall be known by the BS. The BS is aware of the configuration provided to the UE; The system frame timing; and the BS transmission timings (Its own transmission). All information required to be aware of the UE monitoring behavior, i.e., the currently activated setting, is available in the BS. Hence, the BS can follow the switching between multiple settings and be aware of the current setting of the DRX cycle at the UE. The UE behavior is controlled by the BS. The configuration of the UE monitoring the open spectrum can be signaled from the network to the UE.

Summarizing, above, techniques have been described which facilitate modification of the setting of the DRX cycle for one or more upcoming periods of the DRX cycle, when monitoring an open spectrum. In particular, this modification can be based on a network configuration. For example, UE-specific RRC downlink control signaling can provide a configuration of the monitoring of the open spectrum.

The configuration can provide a rule set for the UE behavior. Such rules set can determine one or more trigger criteria for when and how the UE shall adapt the monitoring, e.g., timing parameters of the monitoring, and/or for how long such adaptations shall remain valid.

By such techniques, certain drawbacks of reference implementations can be solved. This is because the adaptation of the monitoring of the open spectrum can allow for a balance between (i) improving the detection performance (e.g., by appropriately specifying one or more trigger criteria for increasing the times during which the UE monitors the open spectrum), and (ii) keeping the power consumption at the UE low (e.g., by appropriately specifying one or more trigger criteria for decreasing the times during which the UE monitors the open spectrum).

The techniques described herein can implement a switching between different settings that is applied upon detecting one or more trigger criteria in accordance with a network configuration. For this purpose, the network configuration can be stored until the one or more trigger criteria are met.

Above, various examples of such that the configuration have been described. As one possibility, the UE may be configured to adapt the length of the ON duration for one or more upcoming periods of the DRX cycle, e.g., based on the historical statistics of when during previous on durations the BS has been able to access the open spectrum. For example, averaging windows may be used. Such statistics could be configured with a set of parameters the UE should consider, as part of one or more trigger criteria. Example trigger criteria include: determination of the COT-AS reception rate; determination, in accordance with a reference timing threshold, of when within an alteration the network transmits the COT-AS; and/or determination of how frequent the network transmits such COT-AS later than a reference timing threshold.

For instance, details with respect to such reference timing thresholds 761 have been discussed above in connection with FIG. 13 and FIG. 14.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described with respect to timing constraints imposed on the UE monitoring the open spectrum in accordance with a DRX cycle. Generally, comparable timing constraints may be applied by time-limited monitoring windows. Such monitoring windows are not necessarily defined in the framework of a DRX cycle, but could be otherwise specified.

For further illustration, various examples have been described with respect to a UE and a BS of a cellular network communicating on an open spectrum. The BS acts as a scheduler for the UE. As a general rule, it would be possible that similar techniques are applied to other devices, e.g., a wireless communication device and an access node of non-cellular network.

In particular, the following examples are disclosed:

EXAMPLE 1. A method of operating a wireless communication device (101), the method comprising:
- receiving, from a network (100), a configuration (4011) for monitoring an open spectrum (481),
- in accordance with the configuration (4011) and a discontinuous reception cycle (370), monitoring the open spectrum (481) for a channel occupancy time acquisition signal (159) from an access node (112) of the network (100),
- based on said monitoring, determining whether or not at least one trigger criterion (750-752) is met, and
- in accordance with said determining whether or not the at least one trigger criterion (750-752) is met, switching between two or more settings (701-702) of the discontinuous reception cycle (370),
- wherein the configuration (4011) comprises the at least one trigger criterion (750-752) for said switching between the two or more settings (701-702).

EXAMPLE 2. The method of claim 1,
wherein the at least one trigger criterion (750-752) comprises a reference reception timing of the channel occupancy time acquisition signal (159).

EXAMPLE 3. The method of claim 2,
wherein the reference reception timing is relatively defined with respect to ON durations (371) of the discontinuous reception cycle (370).

EXAMPLE 4. The method of claim 3,
wherein the reference reception timing comprises a reference timing threshold (761, 762) for reception of the channel occupancy time acquisition signal (159), the reference timing threshold (761, 762) being offset (379) from a start time of the ON duration (371) of the discontinuous reception cycle (370).

EXAMPLE 5. The method of any one of claims 2 to 4,
wherein the reference reception timing comprises a reference reception rate of the channel occupancy time acquisition signal (159).

EXAMPLE 6. The method of any one of claims 2 to 5,
wherein the reference reception timing is defined using a statistics across multiple periods of the discontinuous reception cycle (370).

EXAMPLE 7. The method of any one of the preceding claims,
wherein the at least one trigger criterion (750-752) comprises multiple trigger criteria (750-752),
wherein the switching between the two or more settings (701-702) depends on the detected one of the multiple trigger criteria (750-752).

EXAMPLE 8. The method of claim 7,
wherein the multiple trigger criteria comprise a first trigger criterion (751) and a second trigger criterion (752),
wherein the two or more settings (701-702) comprise a first setting (701), a second setting (702), and a third setting (703),
wherein, when detecting the first trigger criterion (751) based on said monitoring, said switching is from the first setting (701) or the third setting (703) to the second setting (702),
wherein, when detecting the second trigger criterion (750-752) based on said monitoring, said switching is from the first setting (701) or the second setting (702) to the third setting (703),
wherein the first setting (701) comprises a first length (381) of the ON durations (371) of the discontinuous reception cycle (370),
wherein the second setting (702) comprises a second length (381) of the ON durations (371) of the discontinuous reception cycle (370) that is longer than the first length (381),
wherein the third setting (703) comprises a third length (381) of the ON durations (371) of the discontinuous reception cycle (370) that is shorter than the first length (381).

EXAMPLE 9. A method of operating a wireless communication device (101), the method comprising:
- receiving, from a network (100), a configuration (4011) for monitoring an open spectrum (481),
- in accordance with the configuration (4011) and a discontinuous reception cycle (370), monitoring the open spectrum (481) for a channel occupancy time acquisition signal (159) from an access node (112) of the network (100),
- based on said monitoring, determining whether or not at least one trigger criterion (750-752) is met, and
- in accordance with said determining whether or not the at least one trigger criterion (750-752) is met, switching between two or more settings (701-702) of the discontinuous reception cycle (370),
- wherein the configuration (4011) comprises an activation duration (791, 792) of a given setting of the two or more settings (701-702).

EXAMPLE 10. The method of claim 9,
wherein the activation duration (791, 792) is defined from switching to the given setting of the two or more settings (701-702) to a certain count of periods of the discontinuous reception cycle (370).

EXAMPLE 11. The method of claim 9 or 10,
wherein the activation duration (791, 792) is defined from switching to the given setting of the two or more settings (701-702) to a transition of the wireless communication device (101) between two network registration modes (301-303).

EXAMPLE 12. The method of any one of claims 9 to 11, wherein the activation duration (791, 792) is defined from switching to the given setting of the two or more settings (701-702) to a point in time defined with respect to a global timing reference.

EXAMPLE 13. A method of operating a wireless communication device (101), the method comprising:
receiving, from a network (100), a configuration (4011) for monitoring an open spectrum (481),
in accordance with the configuration (4011) and a discontinuous reception cycle (370), monitoring the open spectrum (481) for a channel occupancy time acquisition signal (159) from an access node (112) of the network (100),
based on said monitoring, determining whether or not at least one trigger criterion (750-752) is met,
in accordance with said determining whether or not the at least one trigger criterion (750-752) is met, switching between two or more settings (701-702) of the discontinuous reception cycle (370),
wherein the configuration (4011) comprises values of one or more parameters of the two or more settings (701-702) of the discontinuous reception cycle (370),
wherein the one or more parameters comprise at least one of a periodicity (383) of the discontinuous reception cycle (370) or an inactivity timer (384) associated with the discontinuous reception cycle (370).

EXAMPLE 14. A method of operating a wireless communication device (101), the method comprising:
receiving, from a network (100), a configuration (4011) for monitoring an open spectrum (481),
in accordance with the configuration (4011) and a discontinuous reception cycle (370), monitoring the open spectrum (481) for a channel occupancy time acquisition signal (159) from an access node (112) of the network (100),
based on said monitoring, determining whether or not at least one trigger criterion (750-752) is met,
in accordance with said determining whether or not the at least one trigger criterion (750-752) is met, switching between two or more settings (701-702) of the discontinuous reception cycle (370),
wherein the configuration (4011) comprises values of one or more parameters of the two or more settings (701-702) of the discontinuous reception cycle (370),
wherein the one or more parameters further comprise an on duration of the discontinuous reception cycle (370),
wherein configuration (4011) comprises three or more values of the on duration of the discontinuous reception cycle (370).

EXAMPLE 15. The method of any one of EXAMPLES 1 to 14, further comprising
after switching, applying the setting (701-702) of the discontinuous reception cycle (370) for two or more periods of the discontinuous reception cycles (370).

EXAMPLE 16. A method of operating an access node (112) of a network (100), the method comprising:
transmitting, to a wireless communication device (101), a configuration (4011) for monitoring an open spectrum (481) by the wireless communication device (101),
performing a listen-before-talk procedure on the open spectrum (481), and
in response to the listen-before-talk procedure being successful: transmitting, to the wireless communication device (101) and in accordance with the configuration (4011), a channel occupancy time acquisition signal (159).

EXAMPLE 17. The method of claim 16, further comprising:
upon transmitting the channel occupancy time acquisition signal (159) to the wireless communication device:
monitoring a further communication (4012, 4013) between the wireless communication device (101) and the access node (112),
based on said monitoring, determining whether or not at least one trigger criterion (750-752) is met,
in accordance with said determining whether or not the at least one trigger criterion (750-752) is met, determining that the wireless communication device (101) has switched between two or more settings (701-702) of a discontinuous reception cycle (370), and
transmitting, to the wireless communication device (101) and in accordance with the two or more settings (701-702), one or more further signals on the open spectrum (481).

EXAMPLE 18. A wireless communication device comprising control circuitry configured to execute the method of any one of claims 1 to 15.

EXAMPLE 19. An access node comprising control circuitry configured to execute the method of claim 16 or 17.

The invention claimed is:

1. A method of operating a wireless communication device, the method comprising:
receiving, from a network, a configuration for monitoring an open spectrum,
in accordance with the configuration and a discontinuous reception cycle, monitoring the open spectrum for a channel occupancy time acquisition signal from an access node of the network,
based on said monitoring, determining whether or not at least one trigger criterion is met, wherein the at least one trigger criterion comprises a reference reception timing, the reference reception time comprising a reference timing threshold for reception of the channel occupancy time acquisition signal,
in accordance with said determining whether or not the at least one trigger criterion is met, switching between two or more settings of the discontinuous reception cycle, and
after switching, applying the setting of the discontinuous reception cycle for two or more periods of the discontinuous reception cycles, wherein the configuration comprises the at least one trigger criterion for said switching between the two or more settings.

2. The method of claim 1,
wherein the reference reception timing is relatively defined with respect to ON durations of the discontinuous reception cycle.

3. The method of claim 2,
wherein the reference timing threshold is offset from a start time of the ON duration of the discontinuous reception cycle.

4. The method of claim 1, wherein the reference reception timing comprises a reference reception rate of the channel occupancy time acquisition signal.

5. The method of claim 1,
wherein the reference reception timing is defined using a statistics across multiple periods of the discontinuous reception cycle.

6. The method of claim 1,
wherein the at least one trigger criterion comprises multiple trigger criteria,
wherein the switching between the two or more settings depends on the detected one of the multiple trigger criteria.

7. The method of claim 6,
wherein the multiple trigger criteria comprise a first trigger criterion and a second trigger criterion,
wherein the two or more settings comprise a first setting, a second setting, and a third setting,
wherein, when detecting the first trigger criterion based on said monitoring, said switching is from the first setting or the third setting to the second setting,
wherein, when detecting the second trigger criterion based on said monitoring, said switching is from the first setting or the second setting to the third setting,
wherein the first setting comprises a first length of the ON durations of the discontinuous reception cycle,
wherein the second setting comprises a second length of the ON durations of the discontinuous reception cycle that is longer than the first length,
wherein the third setting comprises a third length of the ON durations of the discontinuous reception cycle that is shorter than the first length.

8. A method of operating a wireless communication device, the method comprising:
receiving, from a network, a configuration for monitoring an open spectrum,
in accordance with the configuration and a discontinuous reception cycle, monitoring the open spectrum for a channel occupancy time acquisition signal from an access node of the network,
based on said monitoring, determining whether or not at least one trigger criterion is met, and
in accordance with said determining whether or not the at least one trigger criterion is met, switching between two or more settings of the discontinuous reception cycle, wherein the configuration comprises an activation duration of a given setting of the two or more settings, the activation duration is defined from switching to the given setting of the two or more settings to a transition of the wireless communication device between two network registration modes.

9. The method of claim 8,
wherein the activation duration is defined from switching to the given setting of the two or more settings to a certain count of periods of the discontinuous reception cycle.

10. The method of claim 8,
wherein the activation duration comprises two or more periods of the discontinuous reception cycle.

11. The method of claim 8,
wherein the activation duration is defined from switching to the given setting of the two or more settings to a point in time defined with respect to a global timing reference.

12. A wireless communication device comprising control circuitry configured to:
receive, from a network, a configuration for monitoring an open spectrum,
in accordance with the configuration and a discontinuous reception cycle, monitor the open spectrum for a channel occupancy time acquisition signal from an access node of the network,
based on said monitoring, determine whether or not at least one trigger criterion is met,
in accordance with said determining whether or not the at least one trigger criterion is met, switch between two or more settings of the discontinuous reception cycle, and
after switching, apply the setting of the discontinuous reception cycle for two or more periods of the discontinuous reception cycles,
wherein the configuration comprises the at least one trigger criterion for said switching between the two or more settings, the activation duration is defined from switching to the given setting of the two or more settings to a transition of the wireless communication device between two network registration modes.

13. A wireless communication device comprising control circuitry configured to execute the method of claim 1.

* * * * *